US009132396B2

(12) United States Patent
Churski et al.

(10) Patent No.: US 9,132,396 B2
(45) Date of Patent: Sep. 15, 2015

(54) SYSTEM AND METHOD FOR AUTOMATED GENERATION AND HANDLING OF LIQUID MIXTURES

(75) Inventors: Krzysztof Churski, Warsaw (PL); Piotr Garstecki, Warsaw (PL); Marcin Izydorzak, Warsaw (PL); Slawomir Jakiela, Warsaw (PL); Tomasz Kaminski, Warsaw (PL); Piotr Korczyk, Warsaw (PL); Sylwia Makulska, Warsaw (PL)

(73) Assignees: INSTYTUT CHEMII FIZYCZNEJ POLSKIEJ AKADEMII NAUK, Warsaw (PL); PZ CORMAY S.A., Lomianki (PL)

( * ) Notice: Subject to any disclaimer, the term of this patent is extended or adjusted under 35 U.S.C. 154(b) by 924 days.

(21) Appl. No.: 13/263,229

(22) PCT Filed: Jan. 21, 2011

(86) PCT No.: PCT/PL2011/050002

§ 371 (c)(1),
(2), (4) Date: Oct. 6, 2011

(87) PCT Pub. No.: WO2011/090396

PCT Pub. Date: Jul. 28, 2011

(65) Prior Publication Data

US 2012/0040472 A1 Feb. 16, 2012

(30) Foreign Application Priority Data

Jan. 24, 2010 (PL) ........................................ 390250
Jan. 24, 2010 (PL) ........................................ 390251
Jan. 11, 2011 (PL) ........................................ 393619

(51) Int. Cl.
*G01N 1/28* (2006.01)
*G01N 21/25* (2006.01)
(Continued)

(52) U.S. Cl.
CPC ............ *B01F 5/0647* (2013.01); *B01F 5/0646* (2013.01); *B01F 13/0059* (2013.01);
(Continued)

(58) Field of Classification Search
CPC .. B01F 13/0059; B01F 5/0647; B01F 5/0646; B01L 3/502784; B01L 3/502715; B01L 3/502738; B01L 2300/0867; B01L 2300/0816; B01L 2400/0655; B01L 2400/049; B01L 2400/0487; B01L 2200/028; Y10T 436/2575; Y10T 436/25
See application file for complete search history.

(56) References Cited

U.S. PATENT DOCUMENTS

2009/0235990 A1 9/2009 Beer

FOREIGN PATENT DOCUMENTS

WO 84/02000 5/1984

OTHER PUBLICATIONS

Churski, K. et al. "Droplet on demand system utilizing a computer controlled microvalve integrated into a stiff polymeric microfluidic device." Lab on a Chip (2010) 10 512-518.*

(Continued)

*Primary Examiner* — Christopher A Hixson
(74) *Attorney, Agent, or Firm* — Westerman, Hattori, Daniels & Adrian, LLP

(57) ABSTRACT

The invention relates to a system (1) for supplying a microfluidic subsystem with liquids, comprising a first valve (14, 29, 46) and a first fluidic duct (10, 25, 28), for connecting said first valve (14, 29, 46) with said microfluidic subsystem and supplying a first liquid, and a second fluidic duct (11), for connecting with said microfluidic subsystem and supplying a second liquid characterized in that said first valve (14, 29, 46) is suitable for closing with time resolution not worse than 100 msec, and parameters of said first fluidic duct (10, 15, 28) are chosen such that the value of $X_1[Pa^{-1}]$, defined as:

$$X_1[Pa^{-1}]=(0.5\times10^{-9}+1/E_1)(\alpha_{R1}L_1^2/A_1)$$

Figure 1:
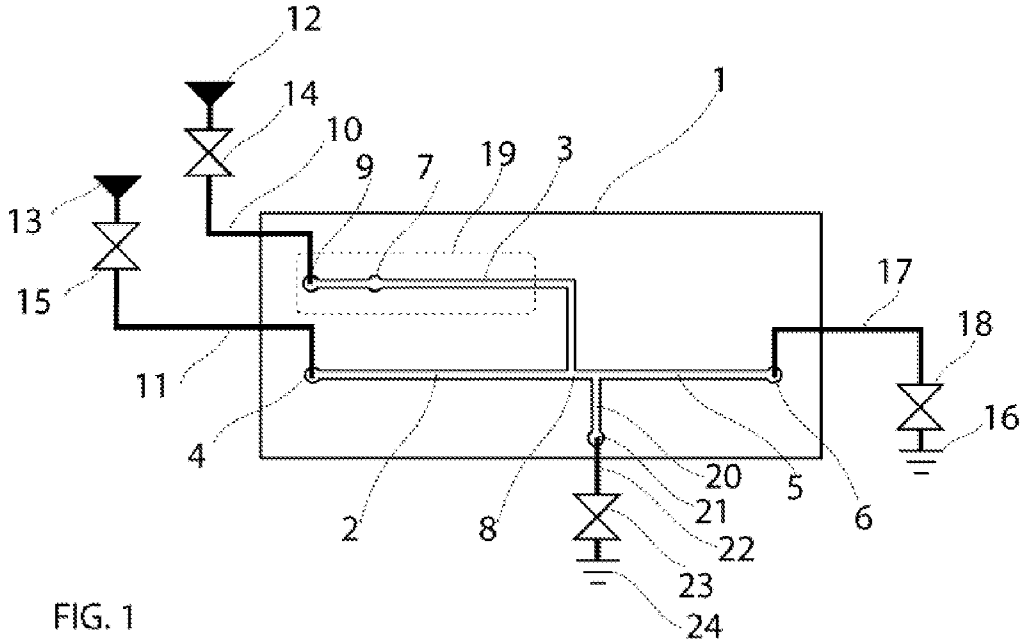

is lower $10^4$ $Pa^{-1}$,
where $E_1$ is the Young modulus of the material, of which said first fluidic duct (10, 25, 28) is made, $L_1$ is the length of the said first fluidic duct (10, 25, 28), $A_1$ is the surface area of the lumen of the said first fluidic duct (10, 25, 28) and $\alpha_{R1}$ is a constant characterizing the geometry of the said first fluidic duct (10, 25, 28) in an equation for the hydraulic resistance $R_1$ of the said first fluidic duct:

$$R_1=\alpha_{R1}(L_1\mu/A_1^2)$$

with μ denoting the dynamic viscosity coefficient of the fluid filling the said first fluidic duct (10, 25, 28) in the measurement of $R_1$.
The invention relates also to a method for producing microdroplets on demand in such a system.

50 Claims, 9 Drawing Sheets

(51) Int. Cl.

*B01L 99/00* (2010.01)
*B01F 5/06* (2006.01)
*B01F 13/00* (2006.01)
*B01L 3/00* (2006.01)

(52) U.S. Cl.

CPC ..... *B01L3/502715* (2013.01); *B01L 3/502784* (2013.01); *B01L 3/502738* (2013.01); *B01L 2200/028* (2013.01); *B01L 2300/0816* (2013.01); *B01L 2300/0867* (2013.01); *B01L 2400/049* (2013.01); *B01L 2400/0487* (2013.01); *B01L 2400/0655* (2013.01); *Y10T 436/2575* (2015.01)

(56) References Cited

OTHER PUBLICATIONS

Churski, Krzystof, "Droplet on demand system utilizing a computer controlled microvalve integrated into a stiff polymeric microfluidic device", Lab on a Chip, Dec. 2009, p. 512-518, vol. 2010 cited in ISR.

International Search Report of PCT/PL2011/050002, mailing date Jun. 14, 2011.

* cited by examiner

SYSTEM AND METHOD FOR AUTOMATED GENERATION AND HANDLING OF LIQUID MIXTURES

The invention relates to a system for supplying a microfluidic subsystem with liquids and to a method for producing microdroplets on demand in such a system. In particular, the present invention relates to the automated systems and techniques for supply of liquid in the form of continuous streams or for deposition of samples of liquids as a sequence of discrete droplets suspended in an immiscible liquid and for metering and transferring these liquids in microfluidic systems. Further, the present invention relates to systems and methods for generation of microdroplets comprising liquids from the said continuous streams or from the said liquid samples, and for merging these microdroplets for generation of mixtures of the input liquids within the microfluidic subsystems. The invention relates also to microfluidic modules that are suitable to take advantage of the supply of liquids performed in accordance with the present invention. The systems constructed in accordance with the present invention can be used to perform single- and multi-step chemical reactions inside microdroplets and for measurement of the result of these reactions as a function of the chemical composition of the said microdroplets and their position in the microfluidic modules. Preferably, the systems constructed in accordance with the present invention can be effectively used for assessment of the results of chemical and biochemical reactions performed on small samples of solutions or biological fluids. The systems constructed in accordance with the present invention can also be used to perform time- and cost-effective studies in microbiology.

Numerous scientific articles and patent applications relating to the use of microfluidic systems in chemistry allow to predict rapid development of 'lab-on-a-chip' technologies. Especially promising is the idea of using microdroplets of volumes ranging from picoliters to microliters, generated inside micrometric channels as miniature reaction beakers. Typically, microfluidic systems that perform reactions inside microdroplets comprise a multiplicity of microfluidic channels that interconnect within the microfluidic chip, and allow for delivery of at least two immiscible liquids and formation of microdroplets of at least one liquid in another immiscible liquid. Further, the microdroplets can be transported along the microfluidic channels, mixed and incubated in selected (either constant or temporally varying) conditions and finally sorted and retrieved from the microfluidic system.

The use of microdroplets in microchannels as microscopic reaction beakers presents several advantages [H. Song, D. L. Chen and R. F. Ismagilov, Ang Chem Int Ed, 2006, 45, 7336-7356]: i) lack of dispersion of time of residence of the elements of liquid in the channel, ii) efficient and rapid mixing, iii) ability to control the kinetics of reactions, iv) ability to conduct multiple reactions in parallel and v) low consumption of reagents. These characteristics make microfluidic microdroplet systems a potentially valuable tool for chemical analyses and syntheses, for biochemistry and form microbiology. The existing reports on use of microdroplet microfluidic systems for compartmentalization of chemical reactions include applications in chemical synthesis [A. Griffiths et al, Compartmentalized combinatorial chemistry by microfluidic control, US patent application US20060078893], and biochemical reactions [A. Hsieh et al, Method and apparatus for rapid nucleic acid analysis, US patent application US20080166720].

One of the outstanding challenges in the development of microdroplet microfluidic chips, is the automation that could allow for an increase of the throughput (number of different reactions performed in a unit of time) and greater flexibility of the protocols of screens, especially individual control over the chemical composition of every microdroplet in the screen. The goal is to develop microdroplet microfluidic chips, allowing for automated generation of microdroplets and conducting of reactions in microdroplets, offering smaller volume of the reaction mixtures and precision and speed similar or better to that offered by automated microtiter systems, or automated systems for biochemical analyses of blood. The robotic microtiter stations operate on reaction volumes in the range of single microliters or more, and offer rate of filling of the wells with reagents in the range of a fraction of a Hertz or slower. Similarly, the robotic stations for biochemical assays on blood (or serum) conduct reactions in volumes of tens to hundreds of microliters and offer speeds in the range of a tenth of a Hertz or slower. In both techniques the precision of dosage of reagents is within few percent (by volume) or better.

Development of automated microdroplet microfluidic chips requires automation of a number of functions, including generation of microdroplets of predetermined volume and at predetermined times of emission in response to an electrical signal from an electronic control unit, merging of microdroplets, mixing of their content, incubation over predetermined interval and in predetermined conditions and a readout of the result of reaction or incubation. Arguably the first challenge is to develop systems for automated, on-demand formation of microdroplets. Systems allowing for such formation should comprise valves that can precisely administer small (in the range of nanoliters) volumes of liquids. In many, especially analytical, applications it is preferred that the microdroplets should be generated from small samples of solutions of reagents, in order to reduce their use. The present invention allows for generation of microdroplets on demand from small samples of liquids. In the following the term 'droplet' will refer to the sample of liquid introduced into the chip for subsequent generation of a number of 'microdroplets' from this sample, wherein said microdroplets' have the volume from 1 pL to 100 μL.

In the literature there are few examples of generation of microdroplets on demand within microfluidic chips. M. Unger et al (Science 288, 2000, 113-116) constructed a microvalve, comprising two perpendicular channels one above the other, separated by a thin elastic membrane. Application of pressure to one of these channels deflects the membrane and closes the lumen of the second channel. This solution is very popular in the microfluidic techniques and there are a number of modifications that are used for on-chip generation of microdroplets, e.g. S. Hulme (Lab Chip 9, 2009, 79-86), S. Zeng (Lab Chip 9, 2009, 1340-1343) or J. Galas (N.J. Phys 11, 2009, 075027).

W. Grover (Sensors Actuators B 89, 2003, 315-323) reported a different microvalve comprising channels and chambers fabricated in stiff material (i.e. glass) and an elastic membrane sandwiched between the stiff substrates. Churski (Lab Chip, 2010, 10, 512-518, Polish patent application P-388565) modified this microvalve for generation of microdroplets on demand in a microfluidic chip.

In the above cited demonstrations of formation of microdroplets on demand within microfluidic chips the valves that control the flow of the liquid-to-be-dispersed-into-microdroplets are integrated in the chip. Fabrication of integrated microvalves increases the cost and time of fabrication of the microfluidic chip. In view of the ease of use of microfluidic systems it is often required or preferred that the microfluidic chips are disposable. Such solution reduces or eliminates the risk of cross-contamination between different reactions. Thus, for economic reasons, it would be beneficial if the microfluidic chips were as simple as possible. Thus, it would be beneficial if the valve controlling the flow of the liquid to be dispersed was positioned outside of the disposable chip.

The present invention Churski (Lab Chip, 2010, 10, 816-818, and the unpublished Polish patent applications P-390250 and P-390251) discloses a system with an external valve characterized by a large dead volume that was modified by insertion of a capillary of large hydraulic resistance. This system allowed for formation of microdroplets of volumes of ranging from nanoliters to microliters and avoided flooding the system upon closure of the valve. This system and method may be advantageous in a number of applications. For example it should allow for formation of microdroplets on demand in large numbers out of solutions delivered from large reservoirs. It can also serve as a source of reagents for e.g. automated process of chemical synthesis. It can also serve as preferable source of microdroplets of a solution that is used in a large number of different analytical experiments, in which the one (or more) common solutions is delivered via a valve from a large reservoir, to avoid the need for refilling of the microfluidic modules with this solution.

The system presented by Churski (Lab Chip, 2010, 10, 816-818, and the unpublished Polish patent applications P-390250 and P-390251) and method that requires the liquid-to-be-dispersed to flow through the valve is not, however, advantageous in a different range of applications that preferably involve small samples of liquids, as i.e. chemical analysis or clinical diagnostics. The disadvantages of this solution include i) contact between the solution of interest with the valve, which makes changing the solution and washing of the system difficult and introduced the risk of cross-contamination between the microdroplets, and ii) large volume of the solution (in the range of milliliters) required for formation of microdroplets. In a different example, the international patent application PCT/GB82/00319, disclosed a system that used external sources of flow of liquids to generate droplets inside a microfluidic chip. In this system, the control of flow of liquids (i.e. the use of syringe pumps and cock-valves) made it impossible to generate droplets with precision and speed that would be competitive to the ones offered by current robotic stations. In a different technique, disclosed in the European patent EP 1 099 483 A1, a valve terminated with a capillary characterized by a large hydraulic resistance was used to emit precisely dosed droplets into the atmosphere surrounding the tip of the capillary. In this technique, as it was designed for deposition of droplets on substrates, the effects of compliance of the capillary in response to the change of pressure was not taken into account and the technique did not define the parameters that are critical for use of such valves for dosing of liquids into microfluidic chips.

A preferred solution should allow for deposition of small samples of liquids in the microfluidic chip, or more generally, in a hydraulic subunit that can be hydraulically interfaced with the microfluidic chip for generation of microdroplets from these samples of liquids, for merging of the microdroplets, creating reaction mixtures and for performing chemical or biochemical reactions in the mixtures. In such a system, the flow of the samples of liquids in the process of generation of microdroplets should be controlled with the flow of an immiscible carrier liquid. Aspiration of samples of liquids into microfluidic systems and formation of microdroplets out of these samples, constitutes one of current challenges in the art of microfluidics.

For example, J. Clausell-Tormos (Lab Chip, 2010, 10, 1302-1307) presented a system for automated aspiration of samples with the use of a multichannel valve normally used in chromatography. The samples of liquids were aspired from a well plate into tubing filled with the immiscible continuous liquid. V. Trivedi (Lab Chip, 2010, 10, 2433-2442) used a flow-focusing junction to form microdroplets from a liquid stored in tubing. Du (Lab Chip, 2009, 9, 2286-2292) constructed a system called SlipChip that allowed to position droplets in the chip via sliding of one microfluidic plate against another plate. Chen (PNAS, 2008, vol. 105, 44, 16843-16848) reported a system called Chemistrode that allowed to aspire liquid samples into droplets passing over a point of interest (e.g. a cell-culture). Liu (Lab on a Chip, 2009, 9, 2153-2162) modified the system for aspiration of small volumes. Sun (Lab Chip, 2010, 10, 2864-2868) presented an automated system for aspiration of samples of liquid from Eppendorf tubes. In all the techniques of aspiration of liquid samples an important problem is to avoid introduction of bubbles of gas into the microfluidic system.

In the state of art there is no system or method for easy deposition of small samples of liquids into a microfluidic system for subsequent generation of microdroplets on demand from the liquid contained in those samples. The solution presented in this application allows for such an easy deposition and subsequent automated generation of microdroplets. The solution being the subject of the current invention allows for introduction of samples of liquids into the microfluidic chip in a number of different routes, and from a number of different sources, including a tubing with samples dispersed in an immiscible carrier liquids, from a pipette tip, or directly onto a well fabricated in the microfluidic system.

Another preferred characteristic of the present invention is the modularity that it offers. Microfluidic systems and subsystems constructed and supplied with liquids in accordance with the present invention can be treated as modules that can be hydraulically connected with the help of tubing or standard hydraulic junctions. In the state of art there are no solutions for modular microfluidic systems for automated generation and handling of microdroplets, allowing for individual control over the microdroplets. P. K. Yuen et al. (Lab Chip, 2008, 8, 1374-1378, Lab Chip, 2009, 9, 3303-3305) presented a modular system called SmartBuild Plug-n-Play Modular Microfluidic System that allows for connecting, disconnecting and mixing of single-phase flows. The system rests on the use of a platform into which the modules can be pinned in a method analogous to that used in the LEGO systems. G. V. Kaigala et al. (Analyst, 2010, 135, 1606-1617) demonstrated a modular system for polymerase chain reaction. V. Trivedi (Lab Chip, 2010, 10, 2433-2442) demonstrated an modular system for generation, merging and spectrophotometric detection of droplets, yet this system does not allow for the individual control over the chemical composition and type and interval of incubation.

The inventors of the current invention noticed unexpectedly that it is possible to construct a microfluidic system that allows for deposition of small samples of liquids separated by an immiscible carrier liquid in such a way as to avoid introduction of bubbles of gas (e.g. air). The microfluidic system that allows for such a deposition, comprises an additional port for introduction of the samples from a tubing or a pipette tip. The inventors have also found that it is possible to construct a system that allows for aspiration of a sample of liquid, surrounded by an immiscible carrier liquid from a prefabricated well, by application of a negative pressure to the outlet of the microfluidic system.

The current invention, as described in detail below, encompasses also the rules for the appropriate choice of materials, from which the hydraulic ducts connecting the valves with microfluidic chips can be fabricated. The correct choice of ducts is dictated by the requirements for the minimum time needed to start the flow in the duct and the hydraulic compliance of the duct and includes both: the geometry of these ducts and the elastic properties (i.e. the Poisson ratio and the Young modulus) of the walls of the ducts.

Similarly unexpectedly, the inventors found that it is possible to form microdroplets of volume ranging from single nanoliters to few microliters, with a satisfactory precision in administering their volume in systems, in which the liquids are supplied via valves of much larger dead volume (i.e. the volume expelled from the valve upon its closure).

The inventors found that it is possible to execute automated protocols, comprising the steps of on-demand formation of microdroplets from samples deposited on chip and of merging of these microdroplets into reaction mixtures. Unexpectedly, the systems constructed in accordance with the present invention, allow for merging of microdroplets of significantly different volumes (e.g. microdroplets of volume of single nanoliters with microdroplets of volume of single microliters), with the help of automated synchronization of the inflow of these microdroplets into a microfluidic junction. In the method, according to the current invention, it is possible to synchronize the flow of microdroplets either via an appropriate choice of the times of their emission, or with the additional feedback from the sensors of positions of microdroplets to the electronic control unit.

Further, it was unexpectedly found that the system constructed in accordance with the present invention allows for the control of the time of incubation of the reaction- and incubation-mixtures over large range of intervals, from fractions of a second to hours. Further, the system constructed in accordance with the current invention allows for execution of a sequence of measurements (e.g. spectrophotometric) on individual microdroplets, on a subgroup of microdroplets in a sequence, or, on all microdroplets in sequence of reaction- or incubation-mixtures. Sequences of measurements performed on individual microdroplets allow for monitoring of the rates of processes undergoing within the microdroplets.

According to the invention, the system comprising a microfluidic subsystem and a supplying part for supplying said microfluidic subsystem with liquids, said supplying part comprising a first valve and a first fluidic duct, for connecting said first valve with said microfluidic subsystem and supplying a first liquid, and a second fluidic duct, for connecting with said microfluidic subsystem and supplying a second liquid is characterized in that said first valve is suitable for closing with time resolution not worse than 100 msec, and parameters of said first fluidic duct are chosen such that the value of $X_1$ [$Pa^{-1}$], defined as:

$$X_1[Pa^{-1}]=(0.5\times10^{-9}+1/E_1)(\alpha_{R1}L_1^{2}/A_1)$$

is lower than $10^4$ $Pa^{-1}$, where $E_1$ is the Young modulus of the material, of which said first fluidic duct is made, $L_1$ is the length of the said first fluidic duct, $A_1$ is the surface area of the lumen of the said first fluidic duct and $\alpha_{R1}$ is a constant characterizing the geometry of the said first fluidic duct in an equation for the hydraulic resistance $R_1$ of the said first fluidic duct:

$$R_1=\alpha_{R1}(L_1\mu/A_1^{2})$$

with μ denoting the dynamic viscosity coefficient of the fluid filling the said first fluidic duct (10, 25, 28) in the measurement of $R_1$.

Preferably, said supplying part additionally comprises a second valve, for closing the flow in said second fluidic duct, wherein said second valve is suitable for closing with time resolution not worse than 100 msec, and parameters of said second fluidic duct are chosen such that the value of $X_2$[$Pa^{-1}$], defined as:

$$X_2[Pa^{-1}]=(0.5\times10^{-9}+1/E_2)(\alpha_{R2}L_2^{2}/A_2)$$

is lower than $10^4$ $Pa^{-1}$, where $E_2$ is the Young modulus of the material, of which said second fluidic duct is made, $L_2$ is the length of the said second fluidic duct, $A_2$ is the surface area of the lumen of the said second fluidic duct and $\alpha_{R2}$ is a constant characterizing the geometry of the said second fluidic duct in an equation for the hydraulic resistance $R_2$ of the said second fluidic duct:

$$R_2=\alpha_{R2}(L_2\mu/A_2^{2})$$

with μ denoting the dynamic viscosity coefficient of the fluid filling the said second fluidic duct in the measurement of $R_2$.

In a preferred embodiment, the value of $X_1$[$Pa^{-1}$] or value of $X_2$ [$Pa^{-1}$] is lower than $10^3$ $Pa^{-1}$, preferably lower than $10^2$ $Pa^{-1}$, most preferably lower than 10 $Pa^{-1}$.

Preferably, hydraulic compliance associated with the elasticity of said first fluidic duct $C_{c1}$ or said second fluidic duct $C_{c2}$ is not higher than $10^{-16}$ $m^3$/Pa, preferably not higher than $10^{-18}$ $m^3$/Pa, most preferably not higher than $10^{-20}$ $m^3$/Pa.

In a preferred embodiment, the hydraulic resistance $R_{out}$ of said first fluidic duct or said second fluidic duct is higher than the hydraulic resistance $R_{in}$ of the inlet of said first valve or second valve, respectively, preferably 10 times higher, most preferably 100 times higher.

In another preferred embodiment, the hydraulic resistance $R_{out}$ said first fluidic duct or second fluidic duct is higher than the hydraulic resistance of said microfluidic subsystem, preferably 10 times higher, most preferably 100 times higher.

Preferably, said first fluidic duct or said second fluidic duct is made of a material, having the Young modulus higher than 0.5 Gpa, preferably higher than 10 GPa, most preferably higher than 100 GPa, such as metal, steel, ceramics, glass or hard polymers.

Preferably, at least one of said valves is suitable for closing with time resolution not worse than 10 msec.

Preferably, at least one of said valves is a piezoelectric valve, a membrane valve or a microvalve.

In a preferred embodiment, the system according to the invention additionally comprises an electric controller of at least one of said valves.

According to the invention, the system preferably comprises a set suitable for supplying said microfluidic subsystem with a sequence of droplets of a third liquid, immiscible with said first liquid and said second liquid, said set comprising an inlet port for droplets of said third liquid connected to a reservoir of lower pressure or to vacuum in such a way that opening of said valve causes pulling-in said droplets of said third liquid from said inlet port to the system.

In another preferred embodiment, the system according to the invention comprises a set for supplying said microfluidic subsystem with a sequence of droplets of a third liquid, immiscible with said first liquid and said second liquid, suspended in said first liquid or said second liquid, comprising an inlet port for connecting a source of said sequence of droplets of said third liquid.

Preferably, said source of said sequence of droplets is a fluidic duct or a pipette.

The solution, in which droplets of the third liquid are pulled-in or supplied to the system, has the advantage that it allows for remarkable reduction of the volume of the liquid, necessary for conducting experiments. In case of providing the continuous liquid, it is necessary to fill the fluidic ducts with this liquid, up to the point, in which the chemical reaction takes place. Change of reactants (in particular—of the third liquid) requires cleaning or rinsing of the fluidic ducts. If the third liquid is supplied to the system in the form of droplets, which are moved within the system due to the move of said first or second liquid—there is no such need. It results of remarkable savings in the third liquid (e.g. for conducting an experiment one needs several μL instead of several mL of the third liquid), as well as remarkably improves the capacity of the experimental system (one can perform a sequence of experiments on different liquids fast).

Preferably, the system according to the invention comprises a junction of said first fluidic duct and said second fluidic duct and it additionally comprises a valve connected through a port with a third fluidic duct, leading from said junction and to port, wherein said valve is connected to a reservoir of lower pressure or to vacuum, such that, opening of said valve decreases the hydraulic resistance at least in part of said third fluidic duct.

Preferably, the system according to the invention additionally comprises at least one detector of a flow in a fluidic duct, preferably a photodetector, in communication with to said electric controller such that said valve can be opened or closed according to signals from said detector.

Preferably, said detector is located and configured to detect and transmit a signal upon such a detection to said electric controller about approaching said junction of said first fluidic duct and said second fluidic duct by the head of one of said droplets.

Preferably, the system according to the invention additionally comprises at least two additional valves, wherein the first of said valves is connected to a source of pressure higher that the second of said valves, connected to the same part of a fluidic duct, such that opening of both said valves causes the flow of liquid in said part of a fluidic duct in the direction from the first of said valves to the second of said valves, and closing of both said valves causes the stop of the flow of liquid in said part of a fluidic duct.

In a particularly favorable embodiment, the system according to the invention comprises two pairs of valves, wherein in each pair the first of said valves is connected to a source of pressure higher that the second of said valves, and the said pairs are connected to the same part of a fluidic duct, such that opening of both valves in said first pair while closing of both valves in said second pair causes the flow of liquid in said part of a fluidic duct in one direction, and opening of both valves in said second pair while closing of both valves in said first pair—causes the flow of liquid in said part of a fluidic duct in the opposite direction.

Preferably, said microfluidic subsystem comprises a meandering part of a fluidic duct for mixing liquids.

Preferably, the system according to the invention comprises a module for detection, preferably for spectrophotometric detection, comprising means for delivering of a radiation beam to a fluidic duct with a liquid, preferably a waveguide, and a detector of radiation that passed through said liquid.

Very favorably, said microfluidic subsystem disposable.

Also favorably, said microfluidic subsystem comprises two or more releasably connectable parts.

In another preferred embodiment, said first valve, said second valve, said first fluidic duct or said second fluidic duct is integrated with said microfluidic subsystem.

The invention relates also to a method for producing microdroplets on demand in a system comprising a first fluidic duct and a second fluidic duct, which meet at a junction, said method comprising the steps of:

supplying said microfluidic subsystem with a first liquid through a first valve and a first fluidic duct, supplying said microfluidic subsystem with a second liquid through a second fluidic duct characterized in that the flow of said first liquid is controlled so as to generate said microdroplets on said junction of the first and second fluidic ducts.

Preferably, parameters of said first fluidic duct (10, 15, 28) are chosen such that the value of $X_1[\mathrm{Pa}^{-1}]$, defined as:

$$X_1[\mathrm{Pa}^{-1}]=(0.5\times10^{-9}+1/E_1)(\alpha_{R1}L_1^2/A_1)$$

is lower than $10^4$ $\mathrm{Pa}^{-1}$, where $E_1$ is the Young modulus of the material, of which said first fluidic duct is made, $L_1$ is the length of the said first fluidic duct, $A_1$ is the surface area of the lumen of the said first fluidic duct and $\alpha_{R1}$ is a constant characterizing the geometry of the said first fluidic duct in an equation for the hydraulic resistance $R_1$ of the said first fluidic duct:

$$R_1=\alpha_{R1}(L_1\mu/A_1^2)$$

with μdenoting the dynamic viscosity coefficient of the fluid filling the said first fluidic duct in the measurement of $R_1$.

Preferably, the inventive method comprises a step of supplying said microfluidic subsystem with a second liquid through a second valve and a second fluidic duct and wherein parameters of said second fluidic duct are chosen such that the value of $X_2$ $[\mathrm{Pa}^{-1}]$, defined as:

$$X_2[\mathrm{Pa}^{-1}]=(0.5\times10^{-9}+1/E_2)(\alpha_{R2}L_2^2/A_2)$$

is lower than $10^4$ $\mathrm{Pa}^{-1}$, where $E_2$ is the Young modulus of the material, of which said second fluidic duct is made, $L_2$ is the length of the said second fluidic duct, $A_2$ is the surface area of the lumen of the said second fluidic duct and $\alpha_{R2}$ is a constant characterizing the geometry of the said second fluidic duct in an equation for the hydraulic resistance $R_2$ of the said second fluidic duct:

$$R_2=\alpha_{R2}(L_2\mu/A_2^2)$$

with μ denoting the dynamic viscosity coefficient of the fluid filling the said second fluidic duct in the measurement of $R_2$.

Preferably, in the method according to the invention, the flow of said second liquid is controlled so as to generate said microdroplets on said junction of the first and second fluidic ducts.

Preferably, said second liquid is a continuous liquid and wets the walls of microchannels in said microfluidic subsystem.

In one preferred embodiment, said first liquid does not wet the walls of microchannels in said microfluidic subsystem and is immiscible with said second liquid.

In such case, said microdroplets on demand are generated due to the flow of said first and second liquids through the junction of fluidic ducts, through which said liquids flow.

In another preferred embodiment, said first liquid is a continuous liquid and wets the walls of microchannels in said microfluidic subsystem and said method additionally comprises a step of providing to the system a third liquid, not wetting the walls of microchannels in said microfluidic subsystem and immiscible with said first liquid and with said second liquid.

Preferably, said third liquid is provided in the form of droplets through a port leading into a fluidic duct and after the droplets are transferred into the fluidic duct, the outflow from the fluidic duct is closed, and the inflow into the fluidic duct is open in order to fill the port with a continuous liquid.

Particularly preferably, the method according to the invention comprises a step of providing to the system a sequence of droplets of said third liquid, dispensed in said first of second liquid.

In such case, said microdroplets on demand are generated due to the flow of said third liquid and said first or second liquid through a junction of fluidic ducts, through which said liquids flow.

In a preferred embodiment, said first liquid and said second liquid is the same liquid.

Preferably, in the method according to the invention, the flow of said first liquid and of said second liquid and optionally also of said third liquid is controlled by opening and closing said first and second valves.

In such case, preferably, the moments of opening and closing said first and second valves are synchronized.

In one preferred embodiment, the beginnings and ends of time intervals, when said first valve is open, are shifted in time with respect to the beginnings and ends of time intervals when said second valve is closed.

In another preferred embodiment, said second valve is closed when said first valve is open and said second valve is open when said first valve is closed.

Preferably, in the method according to the invention, the time shifts between steering impulses, sent to said first and second valves in order to open or close them, are selected so as to compensate for or take advantage of electromechanical inertia of said valves, such that time intervals when said valves are indeed open or closed are essentially synchronized.

In one of preferred embodiments, said steering impulses are rectangular impulses.

In a particularly favorable embodiment, the inventive method further comprises a step of producing reaction mixtures having required concentrations of reactants produced by merging said microdroplets of reactants generated on demand, said microdroplets having required volumes.

Such microdroplets generated on demand preferably have the volume from 0.01 nL to 100 μL.

DETAILED DESCRIPTION OF THE PRESENT INVENTION

Figure 2:
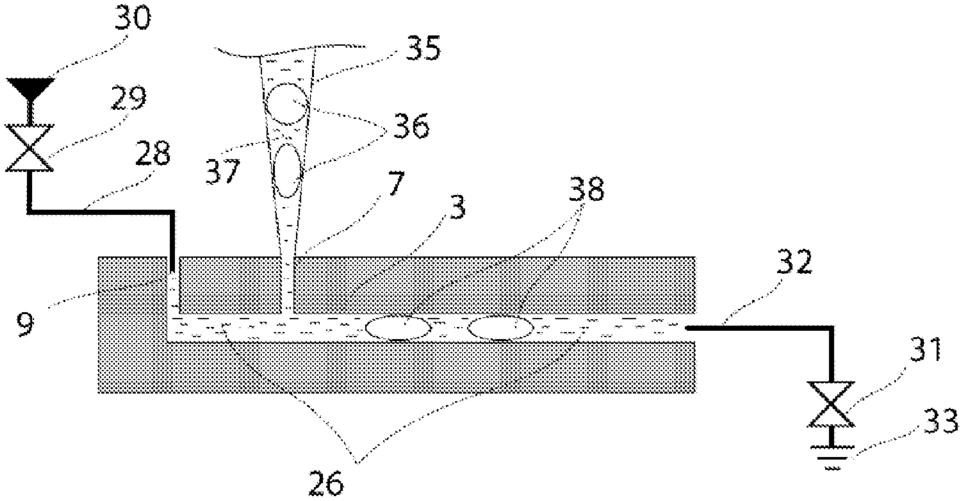
Figure 3:
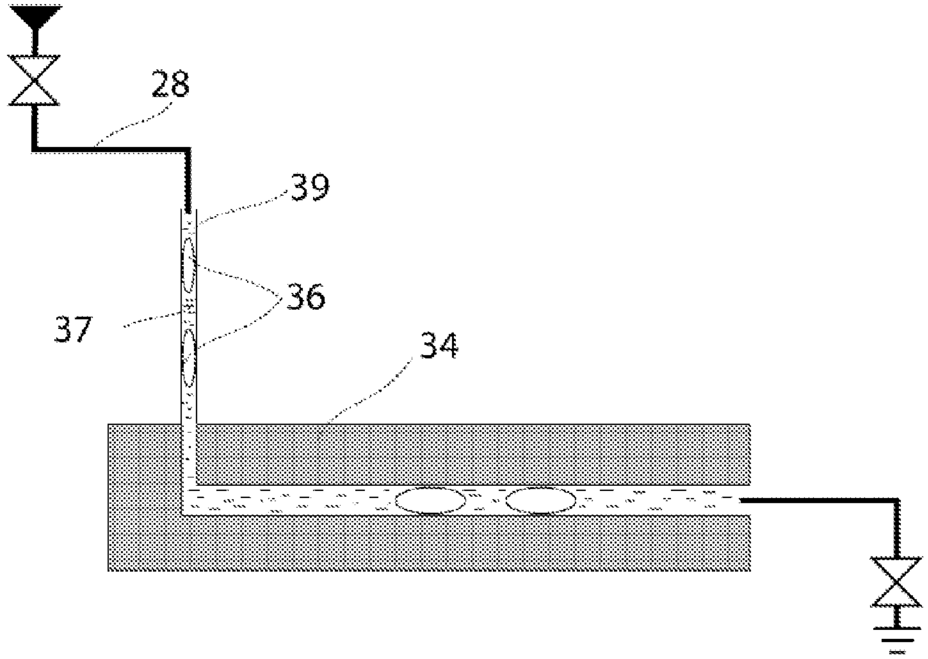

Below we describe preferred exemplary embodiments of the invention and refer to the following figures:

FIG. 1 depicts a scheme of the microfluidic system for formation of microdroplets, designed in accordance with the present invention, FIG. 2 shows a schematic drawing of a sectional view of a portion of a microfluidic system designed in accordance with the present invention, comprising a port for introduction of liquid samples, FIG. 3 shows a schematic drawing of a cross-section of a portion of a microfluidic system designed in accordance with the present invention, comprising a port that allows for introduction of liquid samples from a tubing.

Figure 4:
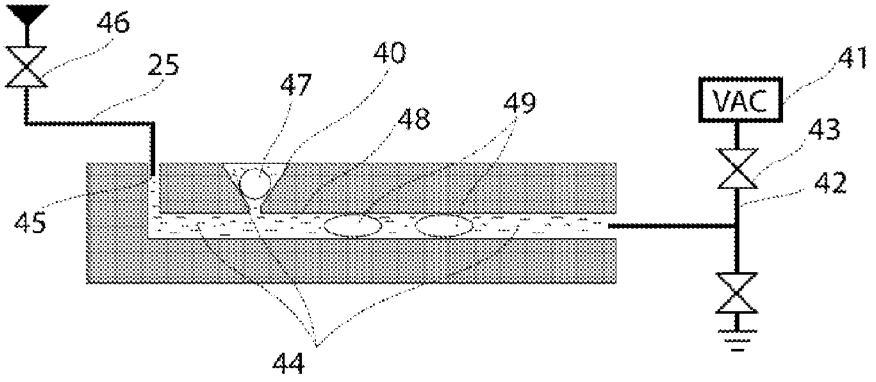

FIG. 4 depicts a schematic drawing of a cross-section of a portion of a microfluidic system designed in accordance with the present invention, comprising a port and a well for introduction of liquid samples.

Figure 5:
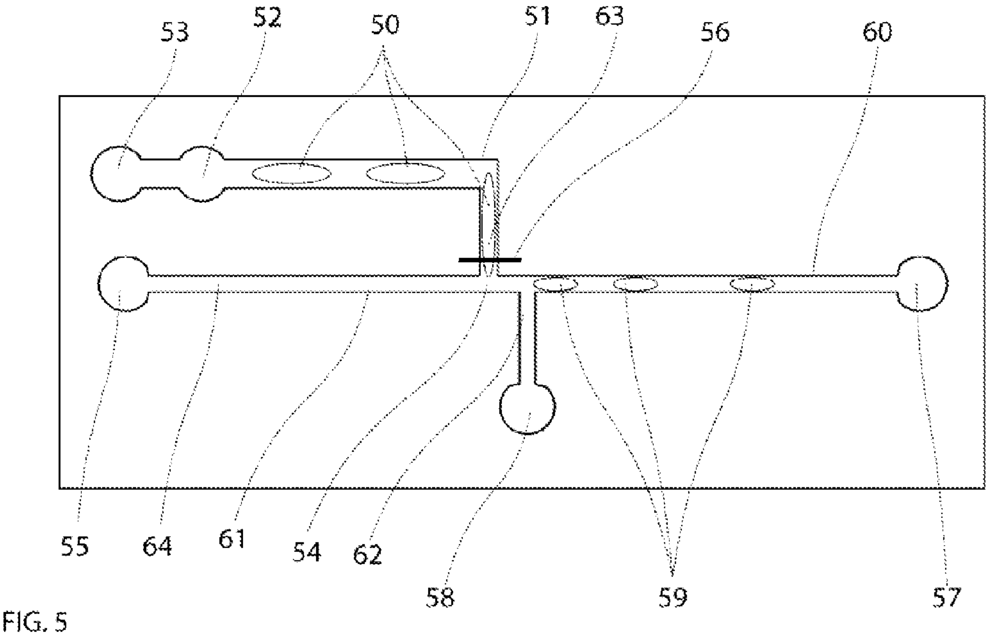

FIG. 5 presents a schematic diagram of a microfluidic system designed according with the present invention, for generation of microdroplets at predetermined times of emission and of predetermined volume out of liquid samples earlier deposited in the said system.

Figure 6:
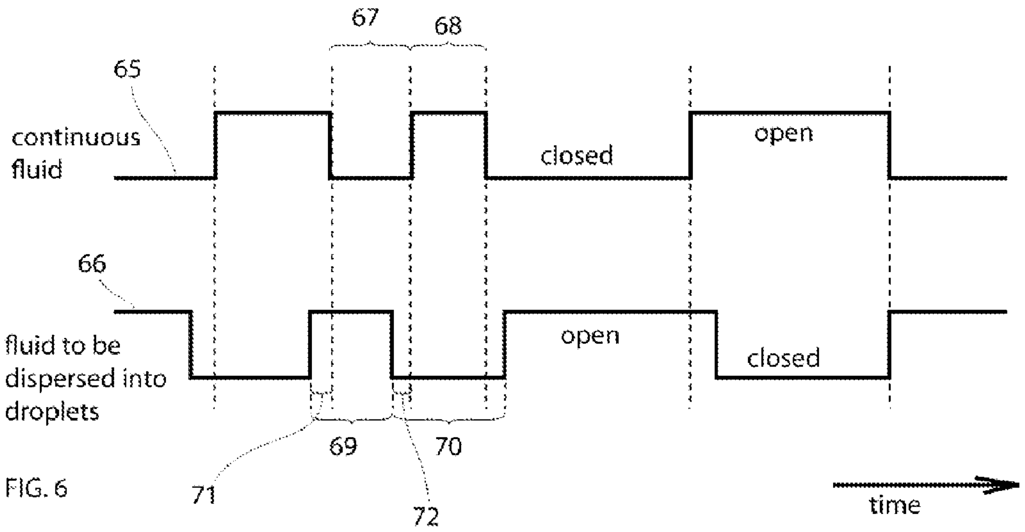
Figure 7:
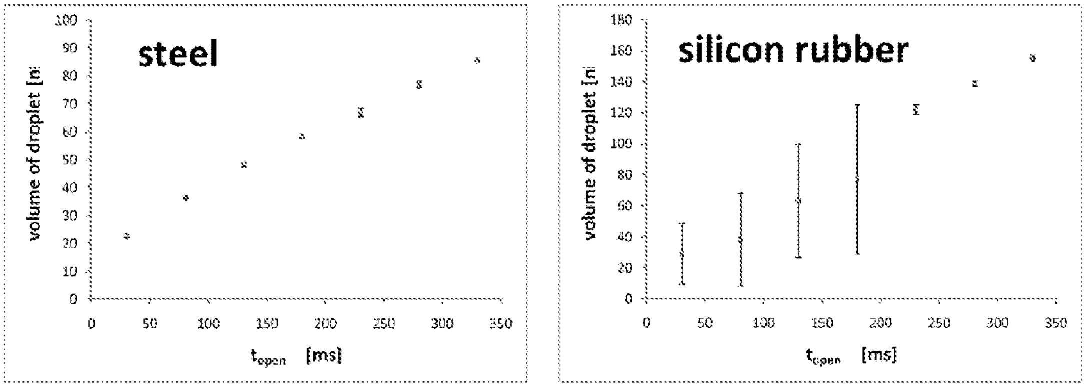

FIG. 6 Demonstrates schematically a sequence of signals that control valves in a system constructed in accordance with the present invention during the process of formation of microdroplets with the use of control of flow of both of the immiscible phases FIG. 7 demonstrates exemplary graphs of volume of microdroplets generated in a system constructed in accordance with the present invention, as a function of the interval during which a valve controlling the droplet liquid is open and compares the performance of a system comprising a steel capillary with that of a system comprising a silicone rubber capillary.

Figure 8:
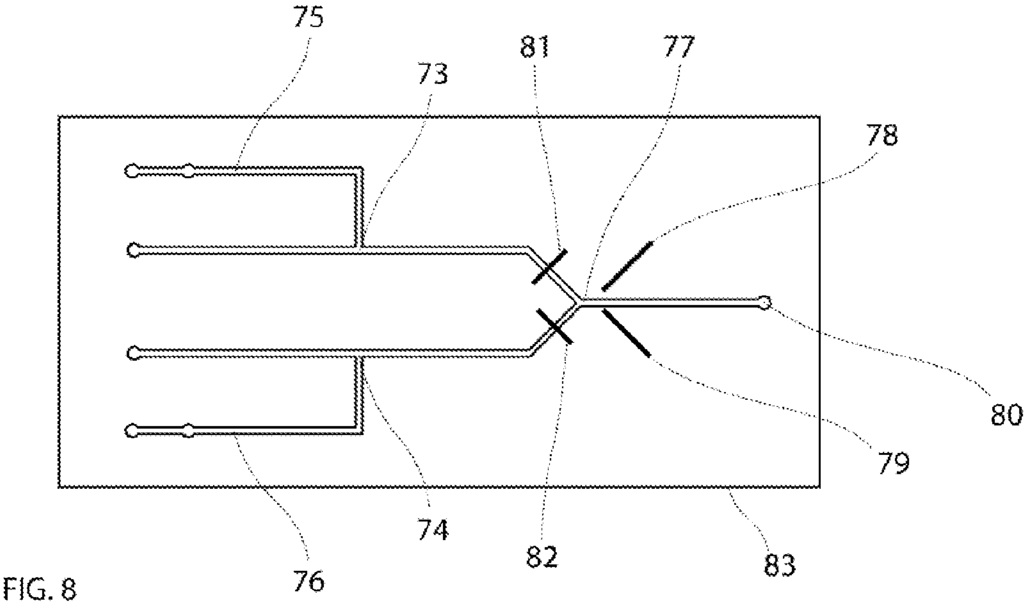

FIG. 8 presents a schematic diagram of a system designed in accordance with the present invention that can be used to form microdroplets from two different liquid samples and to join these microdroplets.

Figure 9:
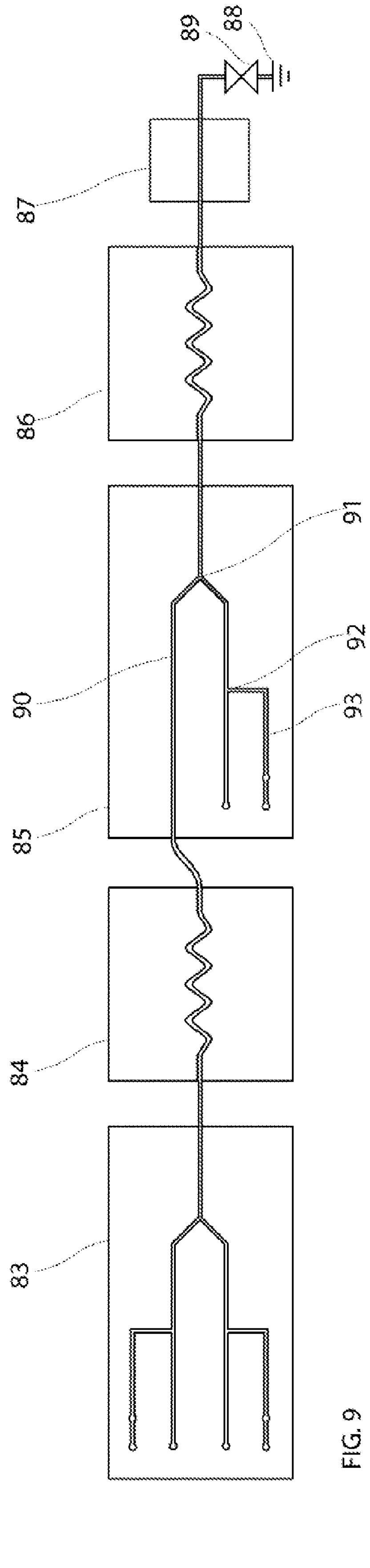

FIG. 9 presents a schematic diagram of a system constructed in accordance with the present invention that can be used for performing two stages of additions of reactants and for monitoring the result of reactions inside microdroplets.

Figure 10:
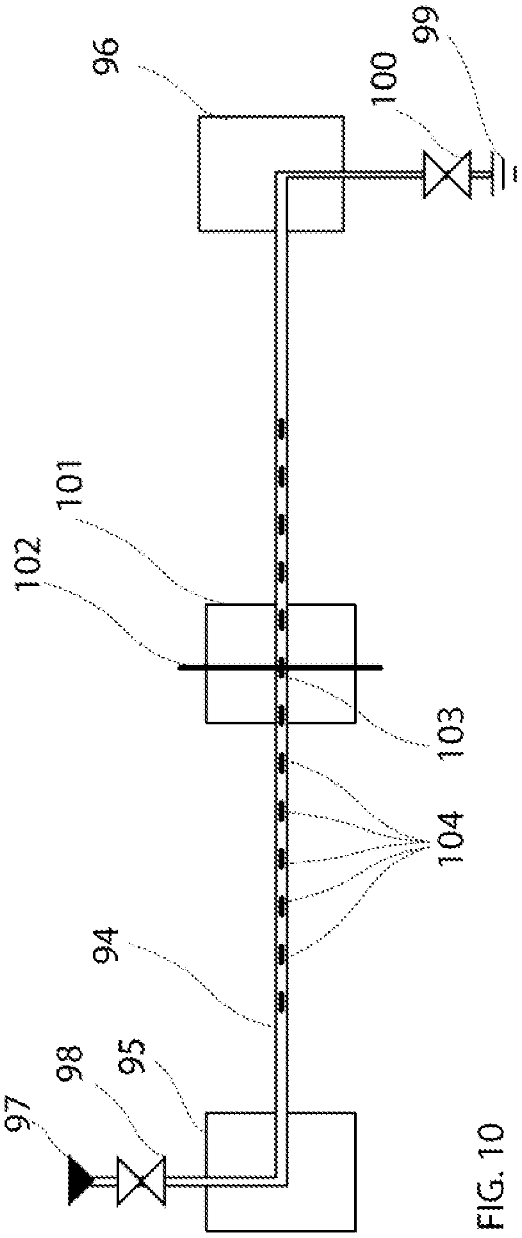

FIG. 10 presents a schematic diagram of a system designed in accordance with the present invention that allows for passage of a sequence of microdroplets through the window of a detector and for stopping any of the microdroplets in the sequence in the said window.

Figure 11:
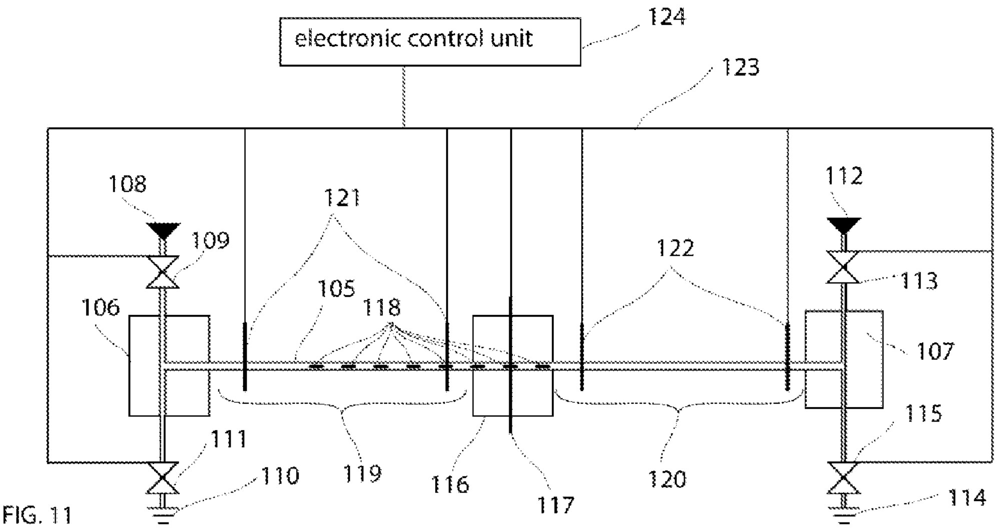

FIG. 11 presents a schematic diagram of a system designed in accordance with the present invention that can be used to perform multiple measurements on any microdroplet in a sequence of microdroplets passing forth and back through the window of a detector.

Figure 12:
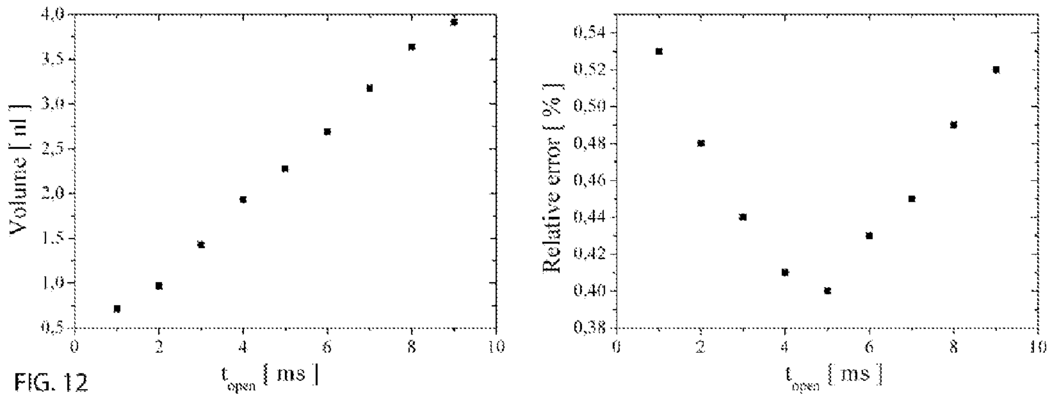

FIG. 12 presents graphs of volume of microdroplets and the standard deviation of the volume of these microdroplets produced from liquid supplied from a large reservoir through a valve at the rate of 100 Hz in an exemplary embodiment of the present invention.

Figure 13:
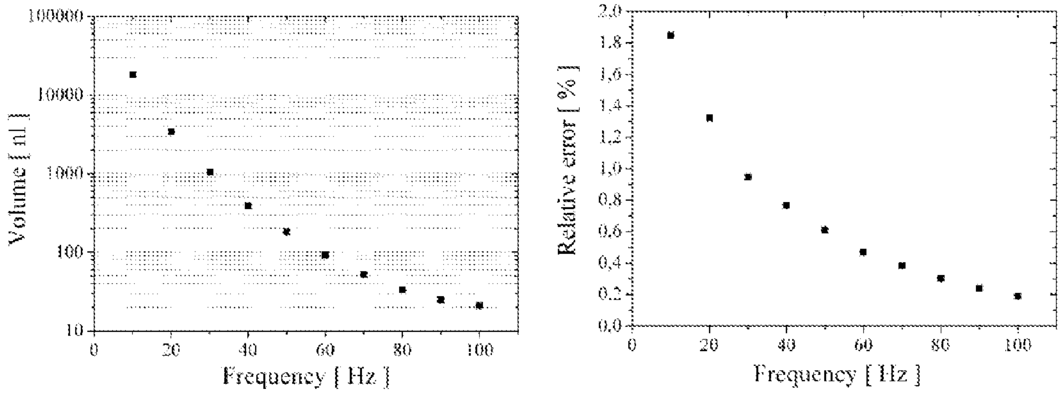

FIG. 13. Presents graphs of volume of microdroplets and the standard deviation of the volume of these microdroplets produced from liquid supplied from a large reservoir through a valve at a range of frequencies of their generation in an exemplary embodiment of the present invention.

Figure 14:
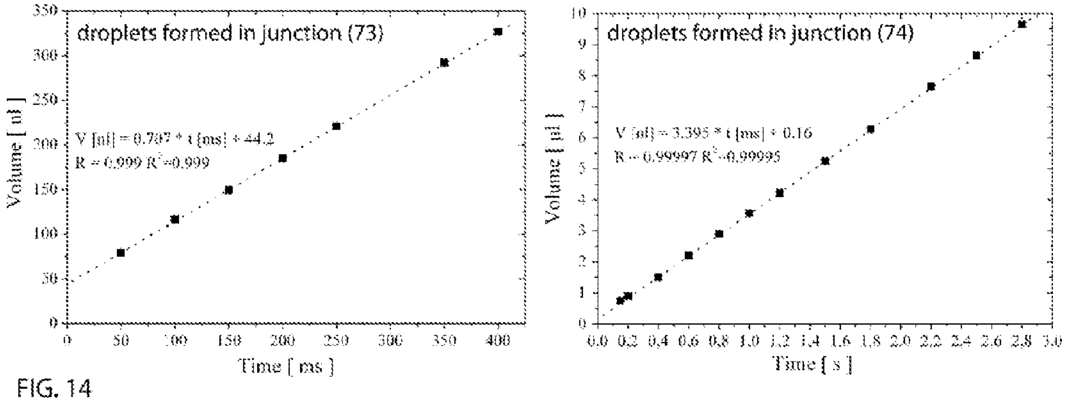

FIG. 14. Shows graphs of volumes of microdroplets and the fit to the linear relation of the volume of the microdroplets to the length of the interval during which the valves controlling the flow of samples is open produced in an exemplary embodiment of the present invention that generates microdroplets from small samples of liquid deposited on the microfluidic chip.

Figure 15:
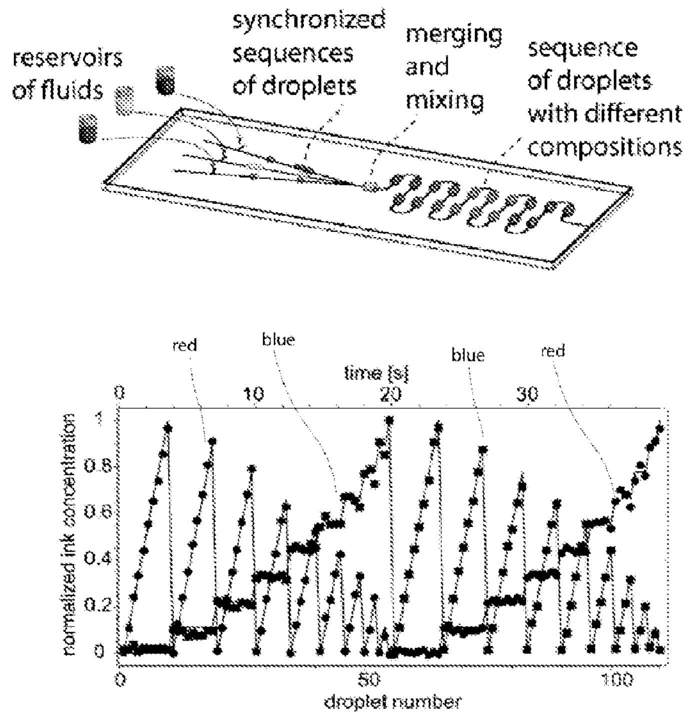

FIG. 15. Illustrates schematically a system for on demand and synchronous generation of packets of microdroplets of three different chemical compositions and subsequent merging of these packets into mixtures, and a graph depicting a screen of concentrations of two exemplary ingredients of the reaction mixtures.

Figure 16:
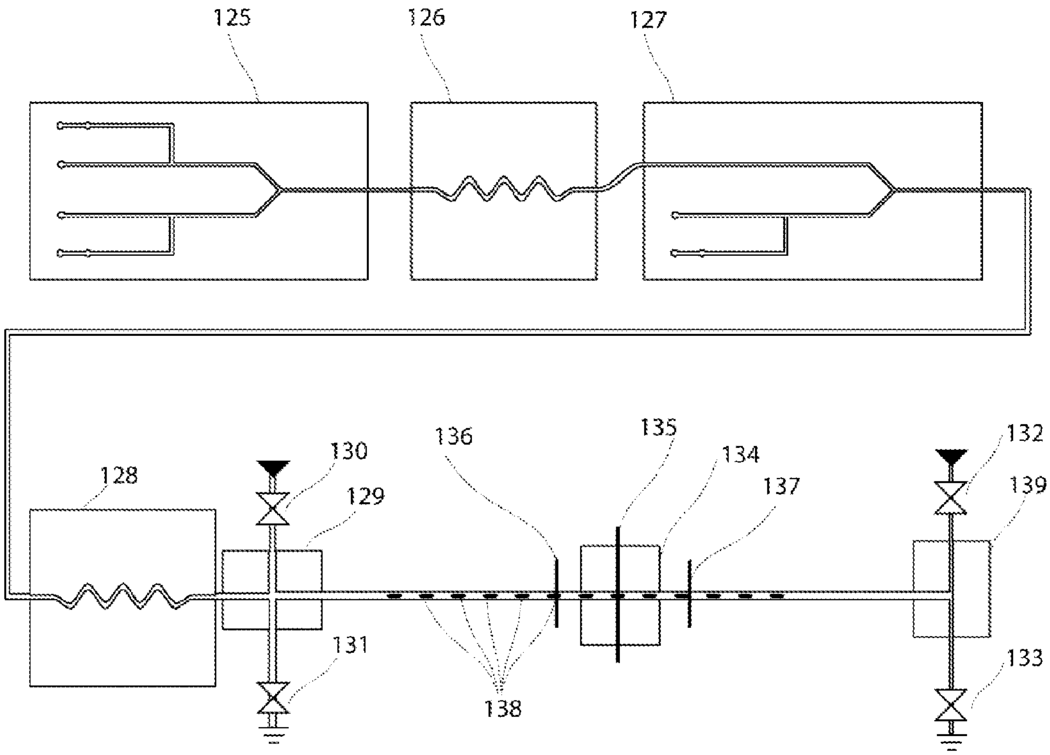

FIG. 16 depicts a schematic illustration of a system designed according with the present invention for determination of kinetics of chemical reactions.

In the present invention microdroplets are formed in microfluidic systems that comprise at least two interconnected channels for transport of liquids. In non-limiting examples the channels have widths and heights ranging from tens of micrometers, hundreds of micrometers to single millimeters.

In an exemplary embodiment of the invention, microdroplets are generated within a microfluidic chip 1. The chip 1 comprises a channel 2 that guides the continuous liquid that wets the walls of the microfluidic channels and an interconnected channel 3 that guides either a stream of liquid to be dispersed that is immiscible with the continuous liquid and that does not wet the walls of the microfluidic channels, or a suspension of samples of non-wetting liquid immiscible with the wetting, continuous liquid suspended in the said continuous liquid.

The continuous liquid is injected into the chip via an inlet port 4 while microdroplets generated in the system flow through the outlet channel 5 into the outlet port 6.

In one variant of the system and method, the chip 1 does not contain the optional port 7 and the liquid that is to be dispersed into microdroplets is delivered from a source 12 through a valve 14 and a fluidic duct 10 into port 9 and channel 3 to the junction 8. In the second variant of the system and method the liquid that is to be dispersed into microdroplets is deposited in the form of small samples into the chip via port 7. After insertion of the liquid samples via port 7 this port is closed and the liquid samples are pushed into the junction 8 with the use of the flow of continuous liquid injected into the system from its source 12 via valve 14, fluidic duct 10 and port 9.

Microfluidic chips suitable for modules in the systems according to the present invention can be fabricated in a range of materials characterized by a wide spectrum of elastic constants. In non limiting examples, chips can be fabricated in polydimethylsiloxane (PDMS) or in polycarbonate (PC).

Preferably, the microfluidic systems are supplied with liquids in such a way, that it is possible to control the inflow of these liquids into the microfluidic systems, with the use of electrical signals. In a preferred embodiment of the present invention, microfluidic chips are supplied with liquids via fluidic ducts 10 and 11 that guide the liquids from pressurized containers, at a constant volumetric rate of flow 12 and 13. In a preferred embodiment of the present invention, electrically controlled valves 14 and 15, are placed on the fluidic paths between the pressurized containers 12 and 13 and the capillaries 10 and 11, respectively. Preferably, although in a non-limiting fashion, the outlet of the microfluidic system can be interconnected to atmospheric pressure 16 via a fluidic connection 17 and an electrically controlled valve 18.

Preferably the liquids delivered to ports 9 and 4 are delivered in such a way that the volumetric rate of flow of these liquids is effectively constant in time during the intervals within which the flow of these liquids is switched on. In a preferred embodiment of the invention the input ports of valves 14 and 15 are connected with reservoirs of liquids held at a pressure that is constant in time and greater than the pressure in the microfluidic system 1. Further, in such a preferred embodiment of the present invention, the outlets of valves 14 and 15 are connected with fluidic ducts 10 and 11 characterized by large hydraulic resistance.

In preferred embodiments of the present invention the microdroplets are formed on demand with a volume of the microdroplets controlled by the length of the interval $t_{open}$ during which the valve 14 controlling the flow of the liquid-to-be-dispersed into microdroplets is open.

In accordance with the present invention, the use of system 1 for generation of microdroplets with precise control over the volumes of these microdroplets having typical magnitude of single nanoliters to single microliters and at frequencies ranging from a fraction of Hertz to hundreds of Hertz requires appropriate choice of the dimensions of the fluidic ducts 10 and 11 and of the materials of which these ducts are made.

In order to correctly choose the dimensions and type of the fluidic ducts 10 and 11 for generation of microdroplets of minimum volume $V_{min}$, with precision $\delta V$ and at a frequency f, one should consider the following criteria:

(i) The minimum interval needed to switch on the flow of liquids in ducts 10 and 11

(ii) The ratio of hydraulic resistances of ducts 10 and 11 to i) the hydraulic resistance of the inlet to the valves 14 and 15, and ii) the hydraulic resistance of the microfluidic chip 1, and (iii) Hydraulic compliances of the ducts 10 and 11

Any liquid filling the duct (e.g. duct 10) possesses its inertia. Starting the flow of such a liquid in such a duct requires a finite time that can be estimated via the following relation:

$$t=r^2/(\gamma_1^2 v)$$

where r is the radius of the lumen of the duct, $\gamma_1$=2.4048 is the first root of the Bessel function of the first kind, and v is the coefficient of kinematic viscosity of the liquid. For ducts of non-circular, yet compact (e.g. rectangular of aspect ratios of width to height larger than ½ and less than 2) cross-section, the same equation can be used as an approximation.

Generation of microdroplets at a frequency f requires that t has a smaller value than the value of 1/f and preferably t has a much smaller value than the value of 1/f. It follows that preferred embodiments of the present invention will comprise fluidic ducts characterized by possibly small cross-sections. This equation also suggest that the liquids of larger viscosity filling the duct will yield shorter relaxation times, i.e. a method that uses an oil driven through the valve and duct to control the flow of low-viscosity aqueous samples downstream is preferred.

For example a fluidic duct of inner diameter of 1 mm and for water filling this duct, the inertial time t=43.2 ms limiting the effective frequency of formation of microdroplets to single Hertz's. In one exemplary and preferred embodiment of the present invention the inner diameter of the duct 10 can be equal to 200 μM yielding the inertial time for water t=1.73 ms, which enables the system to form microdroplets at frequencies of tens of Hertz. In another preferred embodiment of the present invention the diameter of the duct 10 can be equal to 50 μM, yielding the inertial time for water t=0.11 ms, enabling the system to generate microdroplets at rates of hundreds of Hertz.

In preferred embodiments of the present invention the valve (e.g. valve 14) can be a valve characterized by a large dead volume, i.e. characterized by a volume of microliters or milliliters that is pushed out into the outlet of the valve upon the action of the member of the valve that closes the valve. In order to avoid injection of this said dead volume into the microfluidic chip, the hydraulic resistance $R_{out}$ of the duct 10 that connects the valve 14 with the microfluidic chip 1 should be much larger than the hydraulic resistance $R_{in}$ of the fluidic connection between the valve 14 and the container that stores the liquid at pressure $p_{valve}$. In the description that follows we assume that $R_{out}/R_{in}>100$.

The hydraulic resistance of any duct of constant cross-section (i.e. cross-section that does not change along the length of the duct) can be described as:

$$R=(\alpha_R L/A^2)\mu$$

where L is the length of the duct, A is the surface area of the lumen of the duct, $\alpha_R$ is a constant depending on the geometry of the lumen and μ is the dynamic viscosity coefficient of the liquid filling the duct. The value of $\alpha_R$ does not depend on the parameters of the liquid filling the duct and is known to those skilled in the art, e.g. $\alpha_R=8\pi$ for a circular pipe. Values of other cross-sections can be found in e.g. (Mortensen et al, Phys. Rev. E 71, 057301 (2005)).

In the simple case that both of the fluidic connections upstream and downstream of the valve are essentially cylindrical ducts of length $L_{in}$ i $L_{out}$ respectively, and of radii of their lumen $r_{in}$ and $r_{out}$ respectively, the ratio $R_{out}/R_{in}=(r_{in}/r_{out})^4(L_{out}/L_{in})$. Further, assuming that typically $r_{in}=1$ mm, $r_{out}=100$ μm and $L_{in}=10$ mm, we estimate the exemplary minimum length of the duct 10 connecting the valve 14 with the microfluidic chip 1 to be $L_{out}>100$ μm.

In a preferred embodiment of the present invention, the system for delivery of liquids into the microfluidic chip, should deliver these liquids at rates of flow that do not depend on the content of the channels within the microfluidic chip. Microfluidic chips can comprise channels of various cross-sections, ranging from tens of micrometers to single millimeters in width. As microfluidic systems can comprise channels of micrometric cross-sections, it is a useful assumption to estimate, that a typical microfluidic system will present a hydraulic resistance similar to the hydraulic resistance of a capillary of an inner diameter of 100 μm. Such capillary presents a similar hydraulic resistance per unit of its length, as the capillary that connects the valve to the microfluidic chip. In view of this estimate, the length of the fluidic duct 10, should be at least 100 times larger than the length of the channel within the microfluidic chip. Assuming that the typical length of channels on a microfluidic chip ranges in the tens of millimeters, the length of the channel inside the capillary 10 should be $L_{out}>100$ cm. In the examples of embodiments of the present invention the microfluidic channels are typically wider (and taller) than 200 μM and the length of the capillary 10 $L_{out}$ of an inner diameter of 200 μm ranges in tens of centimeters.

In a preferred embodiment of the present invention, the microfluidic system for formation of microdroplets on demand comprises an additional outlet 20 positioned downstream of the junction 8 and interconnected via the port 21, a fluidic duct 22 and a valve 23 with a reservoir 24 of atmospheric pressure. In addition, the outlet 20 can be used to reduce the hydraulic resistance to flow between the junction 8 and a reservoir of an atmospheric pressure 24, during the process of formation of a microdroplet. The procedure of formation of microdroplets on demand that comprises opening of the valve 23 during the interval of formation of a microdroplet, can make the ratio of the hydraulic resistance $R_{out}$ of the capillary 10, to the hydraulic resistance downstream of the junction 8, be effectively independent of the content of the fluidic channels within the microfluidic chip, in particular of the content of the outlet channel 5.

The precision of administering a prescribed volume of liquid into the generated microdroplet is limited by the total hydraulic compliance—C of the fluidic duct, that interconnects the valve with the microfluidic chip. This total hydraulic compliance C can be expressed as a sum:

$$C=C_f+C_c,$$

where $C_f$ represents the hydraulic compliance associated with the compressibility of the liquid that fills the capillary, and $C_c$ represents the hydraulic compliance associated with the elasticity of the walls of the capillary.

The hydraulic compliance is a physical quantity that describes the elastic compliance of the capillary and the compressibility of the liquid that fills the said capillary. If a capillary maintained at pressure $p_0$ is filled with liquid of volume $V_0$ and then, the capillary is interconnected fluidically with a container of the same liquid maintained at pressure $p_1=p_0+\Delta p$ then, an additional volume of liquid will flow into the capillary. If later, the fluidic connection of the said capillary with the said pressurized container, maintained at pressure $p_1$ will be closed, and the capillary will be interconnected with a second reservoir maintained at pressure $p_0$, then a volume $\Delta V$ of liquid will flow out of the capillary into the said second reservoir. Numerically, the volume $\Delta V$ can be estimated as:

$$\Delta V=\Delta p(C_f+C_c).$$

It should also be observed that the volume $\Delta V$ is pushed out of the fluidic duct 10 or 11 after closure of the valve 14 or 15 within an extended interval $\Delta t$. Since the pressure difference exerted by the contracting walls of the fluidic duct and by the compressed liquid is equal or less than $\Delta p$ the rate of outflow of liquid after the closure of valve 14 or 15 is equal or less than that when the valve is open. Thus, the magnitude of volume $\Delta V$ limits both the precision of administering a given volume of the microdroplet via control of the interval $t_{open}$, and the minimum interval between generation of subsequent microdroplets for the volume $\Delta V$ to be completely pushed out from the duct 10 or 11 before the process of generation of a new microdroplet starts. In preferred embodiments of the present invention it is assumed that the maximum limit on the interval between generation of subsequent microdroplets should not be larger than a typical interval for formation of a microdroplet ($t_{open}$) or the reciprocal of the expected frequency (f) of formation of microdroplets.

The hydraulic compliance $C_f$ associated with the compressibility of the fluid depends on the type of fluid filling the capillary. Numerically the magnitude of the hydraulic compliance $C_f$ associated with the compressibility of the fluid can be estimated as $C_f=V_0*\beta_t$, where $\beta_t$ represents the coefficient of isothermal compressibility of the fluid that fills the capillary.

In particular, in view of the very large magnitude of the isothermal compressibility of gases, in preferred embodiments of the invention, one avoids the presence of bubbles of gas in the capillary. Embodiments of the present invention make it possible to deposit samples of liquid in fluidic ducts and later, to cause motion of these liquid samples, controlled by the inflow of an immiscible continuous phase, into the said fluidic ducts, without introduction of bubbles of gas.

The magnitudes of the coefficients of isothermal compressibility of most liquids under normal conditions are similar. For example, the coefficient of isothermal compressibility of water in normal conditions is ca. $5\times10^{-10}$ [$Pa^{-1}$] while the coefficient of isothermal compressibility of most alkanes and oils ranges between ca. $5\times10^{-10}$ [$Pa^{-1}$] and ca. $12\times10^{-10}$ [$Pa^{-1}$].

The hydraulic compliance $C_c$ associated with the elasticity of the capillary depends both on the properties of the material of which the capillary is built, in particular the Young modulus (E) and the Poisson ratio (σ) of this material, and on the geometry of the capillary, in particular its length (L), radius (r) of the lumen of the capillary and the width (h) of the wall of the capillary. For capillaries comprising thick walls (h>r) the hydraulic compliance $C_c$ can be estimated as:

$$C_c=2V_0(1+\sigma)/E.$$

while for capillaries comprising thin walls (h<r) the same compliance can be estimated as:

$$C_c=2V_0(r/h)/E$$

where $V_0$ represents the volume of the capillary $V_0=\pi r^2L$. As the subject of the present invention is to reduce the hydraulic compliance, in the following we only consider the use of fluidic ducts comprising thick walls (not shown) and including both ducts of circular cross-sections and non-circular cross-sections (as e.g. rectangular cross-sections typical to microfluidic systems).

Inserting the relations for the compliances $C_c$ and $C_f$ we obtain an expression for the volume ΔV pushed out of the capillary upon reduction of pressure of the liquid by a value of Δp:

$$\Delta V=\Delta p\, V_0\beta_t+2\Delta p\, V_0(1+\sigma)/E=\Delta V_f+\Delta V_c$$

It is evident from the above expression that the volume ΔV, pushed out of the capillary upon a decrease of pressure by Δp, has a contribution $\Delta V_f$, associated with the compressibility of the liquid, and a contribution $\Delta V_c$, associated with the elasticity of the walls of the capillary.

In accordance with the present invention, the process of formation of a microdroplet begins with the valve 14 controlling the flow in duct 10 is closed, and the pressure within the duct 10 is equal to the pressure ($p_{chip}$) in the microfluidic chip 1. Upon opening of the valve 14, the liquid begins to flow through the capillary 10. To a good assumption, the pressure within the capillary 10 varies linearly between the values of ($p_{valve}$) at the inlet of the capillary 10 to the value $p_{chip}$, at the terminus of the said capillary. Since the effects of compliance are proportional to local pressure we can estimate the volume accommodated by the whole duct inserting and average change in pressure (Δp/2), with $\Delta p=p_{valve}-p_{chip}$. The capillary accommodates the additional volume of liquid:

$$\Delta V=\Delta V_f+\Delta V_c,$$

where $$\Delta V_f\sim(\Delta p/2)V_0\beta_t$$

and $$\Delta V_c\sim\Delta p\, V_0(1+\sigma)/E.$$

After successive closure of the valve 14 the pressure in the capillary reduces to $p_{chip}$ and the volume ΔV is pushed out into the microfluidic chip.

In the following analysis we assume that in order to sustain a precision of 1% in administering a given volume of the microdroplet, the volume ΔV should not exceed 1% of the minimum volume $V_{min}$, of a microdroplet that can be generated in a given system. Similarly, in order to sustain a precision of 10% in administering a given volume of the microdroplet, the volume ΔV should not exceed 10% of the minimum volume $V_{min}$ of a microdroplet, that can be generated in a given system. In the following we analyze the contribution to the total hydraulic compliance of the capillary associated with the elasticity of the capillary. If the limitation in the compliance $C_c$ is more restrictive than that resulting from the compliance $C_f$ associated with the compressibility of the liquid, then the compliance $C_f$ determines the precision of the system for generation of the microdroplets. Numerically, the importance of the two contributions can be evaluated by comparing the value ($1/E_{min}$) with the value of fat, where $E_{min}$, represents the minimum value of the Young modulus, required for the given precision in administering of the volumes of the microdroplets. If the value of $1/E_{min}$ is less than the value of $\beta_t$, then the maximum precision of administering the volumes of the microdroplets is limited by the isothermal compressibility of the liquid.

In the following exemplary calculation of the required dimensions and elastic properties of the capillary, we will assume three different minimum volumes of microdroplets generated in the system: $V_{min}$=1 nL, 10 nL, and 100 nL. We will also assume, for simplicity, that the coefficient of isothermal compressibility of the liquid is $\beta_t=1\times10^{-9}$ [$Pa^{-1}$].

Assuming that the required precision in administering of the volumes of microdroplets is 1%, we obtain the maximum allowable values of the volume pushed out of the capillary upon closure of the valve as: $\beta V_{max}=V_{min}/100$=0.01 nL, 0.1 nL and 1 nL.

Further, in view of the requirement that the capillary 10 should yield a short inertial time t (as described above), required for switching the flow in this capillary on, we assume that the radius of the lumen of this capillary is 50 μm. In view of the requirement that the hydraulic resistance of the capillary, should be much larger than the hydraulic resistance of the microfluidic chip 1, we assume that the length L of the capillary is L=5 cm.

In order to simplify the calculation, we assume that the Poisson ratio is equal to 0.4, and obtain the following approximate relation for the minimum value of the Young modulus, that yields the required precision as:

$$E_{min}=1{,}4*V_0*\Delta p/\Delta V_{max},$$

For Δp=5 bar we obtain:

$E_{min}$=27.489 GPa (for $V_{min}$=1 nL); $1/E_{min}=0.04\times10^{-9}$ $Pa^{-1}$ $E_{min}$=2.749 GPa (for $V_{min}$=10 nL); $1/E_{min}=0.36\times10^{-9}$ $Pa^{-1}$ $E_{min}$=0.275 GPa (for $V_{min}$=100 nL); $1/E_{min}=3.6\times10^{-9}$ $Pa^{-1}$.

In another example, for Δp=0.5 bar we obtain:

$E_{min}$=2,749 GPa (for $V_{min}$=1 nL); $1/E_{min}=0.36\times10^{-9}$ $Pa^{-1}$ $E_{min}$=0.275 GPa (for $V_{min}$=10 nL); $1/E_{min}=3.6\times10^{-9}$ $Pa^{-1}$ $E_{min}$=0.027 GPa (for $V_{min}$=100 nL); $1/E_{min}=36\times10^{-9}$ $Pa^{-1}$.

In a yet another example, for Δp=0.05 bar we obtain:

$E_{min}$=0.275 GPa (for $V_{min}$=1 nL); $1/E_{min}=3.6\times10^{-9}$ $Pa^{-1}$ $E_{min}$=0.027 GPa (for $V_{min}$=10 nL); $1/E_{min}=36\times10^{-9}$ $Pa^{-1}$ $E_{min}$=0.003 GPa (for $V_{min}$=100 nL); $1/E_{min}=360\times10^{-9}$ $Pa^{-1}$.

The above results univocally restrict the range of materials, from which the capillaries (e.g. 10) that interconnect the valves (e.g. 14) with the microfluidic chip (e.g. 1), can be made. The table below summarizes exemplary elastic parameters of few common materials:

| | silicone rubber | Teflon | Polyethylene | PEEK | Glass | Steel |
|---|---|---|---|---|---|---|
| Young modulus E [GPa] | 0.002 | 0.5 | 2 | 3.6 | 50-90 | 210 |
| Poisson ratio σ [—] | 0.5 | 0.45 | 0.4 | 0.4 | 0.2-0.3 | 0.3 |

In view of the above quoted results, it follows that, for systems supplied with the droplet liquid from reservoirs maintained at a pressure of approximately 5 bar, for generation of microdroplets smaller than 1 mL with a 1% precision in their volume, it is necessary to use capillaries fabricated in glass or steel, while for generation of microdroplets smaller than 10 nL it is necessary to use capillaries fabricated in hard polymers (polyethylene, PEEK), or in glass or in steel, and similarly for generation of microdroplets smaller than 100 nL with the same precision the same materials (hard polymers, glass or steel) can be used. It is also evident, from the examples above, that the elastic properties of the capillary will have a significant impact on the precision of generation of microdroplets of volumes larger than ca. 10 nL.

In view of the above quoted results, it follows that, for systems supplied with the droplet liquid from reservoirs maintained at a pressure of approximately 0.5 bar, for generation of microdroplets smaller than 1 nL with a 1% precision in their volume, it is necessary to use capillaries fabricated in the hardest polymers (e.g. PEEK), in glass or in steel, while for generation of microdroplets smaller than 10 nL or smaller than 100 nL it is necessary to use capillaries fabricated in polymers (e.g. Teflon, Polyethylene or PEEK), or in glass or in steel. It is also evident from the examples above that the elastic properties of the capillary will have a significant impact on the precision of generation of microdroplets of volumes larger than ca. 1 nL.

Similarly, for systems supplied with the droplet liquid from reservoirs maintained at a pressure of approximately 0.05 bar, for generation of microdroplets smaller than 1 nL or smaller than 10 nL with a 1% precision in their volume it is necessary to use capillaries fabricated in the polymers (e.g. Teflon, Polyethylene or PEEK) or in glass or in steel, while for generation of microdroplets smaller than 100 nL it is possible to use capillaries fabricated in a wide range of materials, including even the silicone rubber. It is also evident from the examples above that the elastic properties of the capillary will have a significant impact on the precision of generation of microdroplets of all considered volumes, including those smaller than 1 nL and those larger than 1 nL.

The above quoted requirements, can be expressed in the preferred ranges of the total hydraulic compliance of the fluidic ducts interconnecting the valves with the microfluidic chips. In particular, for pressures applied to the reservoir of liquid in the range of 0.1 bar, for generation of microdroplets of minimum volumes $V_{min}$=1 nL with precision of 1% of the predetermined volume of the microdroplet, the total hydraulic compliance C should be less than $10^{-18}$ $m^3$/Pa, while for $V_{min}\approx 10$ nL $C<10^{-17}$ $m^3$/Pa, and for $V_{min}\approx 100$ nL $C<10^{-16}$ $m^3$/Pa. Similarly for $\Delta p\approx 1$ bar, for $V_{min}\approx 1$ nL $C<10^{-19}$ $m^3$/Pa, for $V_{min}\approx 10$ nL $C<10^{-18}$ $m^3$/Pa, and for $V_{min}\approx 100$ nL $C<10^{-17}$ $m^3$/Pa. Similarly, for $\Delta p\approx 10$ bar, for $V_{min}\approx 1$ nL $C<10^{-20}$ $m^3$/Pa, for $V_{min}\approx 10$ nL $C<10^{-19}$ $m^3$/Pa, and for $V_{min}\approx 100$ nL $C<10^{-18}$ $m^3$/Pa.

Further, for the sake of providing guidelines for design of the systems according to the present invention it is beneficial to observe that, the volume pushed out of the fluidic duct due to the effects of hydraulic compliance can be expressed approximately as:

$$\Delta V=\Delta pAL\beta$$

where $\Delta p$ is the difference of pressures upstream of the valve ($p_{valve}$) and in the microfluidic chip ($p_{chip}$), A is the area of cross-section of the fluidic duct connecting the valve with the microfluidic channels, L is the length of the said duct and $\beta$ is an approximated constant representing the compliance of the duct: $\beta=(\beta_t/2)+(1+\sigma)/E$. Since the value of $\beta_t$ is similar for most liquids at normal conditions and since $(1+\sigma)$ ranges only within less than 20% for a wide range of materials (1.3 for steel and 1.5 for silicone rubber) and less than within 50% of unity, we can—for simplicity—further estimate $\beta$ as: $\beta=0.5\times 10^{-9}+1/E$, with E expressed in the units of [Pa] and $\beta$ expressed in the units of [$Pa^{-1}$]. Further, of practical interest is only the ratio of $\Delta V$ to the smallest volume $V_{min}$ of a microdroplet generated on demand. $V_{min}$ can be expressed as:

$$V_{min}=t_{open}Q=t_{open}\Delta p/R=t_{open}\Delta pA^2/\alpha\mu L.$$

Then, the ratio $\Delta V/V_{min}$ can be simplified to:

$$\Delta V/V_{min}=(\beta\alpha_R L^2/A)(\beta/t_{open}).$$

with $\beta$, $\alpha_R$, L and A being a set of parameters characterizing the hydraulic duct, and $\mu$ and $t_{open}$ being a set of parameters of the method. In preferred embodiments of the invention $t_{open}$ can be assumed not to be larger than 1 s and more preferably not to be larger than 100 ms or most preferably not to be larger than 10 ms. Dynamic viscosity coefficient can be assumed to be smaller than 100 mPa·s, or smaller than 10 mPa·s or approximately equal 1 mPa·s for aqueous solutions.

Since, in order not to excessively limit the frequency of formation of microdroplets, the ratio $\Delta V/V_{min}$ should, preferably be less than 1, the above considerations can be gathered into a simple condition for the fluidic duct connecting the valve to the microfluidic channels as:

$$\beta\alpha_R L^2/A=(0.5\times 10^{-9}+1/E)(\alpha_R L^2/A)<X[Pa^{-1}],$$

where $X=(\Delta V/V_{min})(t_{open}/\mu)$. Inserting the above quated values of $t_{open}$ and $\mu$, we obtain $X=10^4$ $Pa^{-1}$, preferably $X=10^3$ $Pa^{-1}$, more preferably $X=10^2$ $Pa^{-1}$ and most preferably $X=10$ $Pa^{-1}$.

The region 19, marked in FIG. 1 with a dashed line, enables introduction into the microfluidic chip 1 a number of liquid samples. A schematic diagram of the cross-section of this region is drawn in detail in FIG. 2. Preferably, the microfluidic chip 1 contains a channel 3 that is supplied with the continuous liquids 26 via port 9. This continuous liquid is preferably supplied via a hydraulic duct 28 from a valve 29, controlled by an electric controller (not shown), from a pressurized container of the said liquid, yielding an effectively constant rate of flow 30 of the said liquid, when the valve 29 is open. Preferably, the outlet of channel 3 is connected to other fluidic ducts within the microfluidic chip, or with other microfluidic chips, in such a way, that it is possible to control the flow of liquids through channel 3 with the use of, for example, a valve 31, positioned on a hydraulic duct 32 that connects the said microfluidic chip with a reservoir of atmospheric pressure 33. Preferably, the channel 3 comprises and additional inlet port 7, that makes it possible to insert the terminus of a pipette tip 35 into the microfluidic chip. In a preferred embodiment of the present invention, the hydraulic ducts of the microfluidic chip are first filled with the continuous, wetting, liquid 26, for example, through the inlet port 9. Then the flow of this continuous liquid is stopped, for example, with the use of the valve 29. Then the terminus of a pipette tip 35 is inserted into port 7. Preferably, this pipette tip contains at least one sample 36 of liquids that are immiscible with the continuous liquid 26, 37 and suspended in the said immiscible, continuous liquid. Then, with the valves that control the outflow (e.g. 31) of the liquids from the channel 3, the suspension of liquid samples contained in the pipette tip 35 is transferred into the channel 3 in such a way that after the said transfer, the samples 36 are positioned downstream of the port 7, as illustrated 38. Preferably, after the liquid samples 36, 38 are transferred into the channel 3, the outflow from the channel 3 is closed, and the inflow into the channel 3 is open in order to fill the port 7 with the continuous liquid 26, in order to avoid entrapment of any gaseous bubbles. In a preferred embodiment of the present invention the operation of transferring the liquid samples 36 from a pipette tip 35 into the channel 3 can be repeated, until a required sequence of liquid samples 38 is deposited in the channel 3. Preferably, after the required sequence of liquids samples is deposited in the channel 3, the port 7 is tightly closed, enabling the sequence of samples 38 to be moved with the flow of the continuous liquid 26 that is controlled with the use of electrical signals originating from an electric controller (not shown) that control the state of the input (e.g. 29) and output (e.g. 31) valves.

In another preferred embodiment of the present invention the pipette tip 35 is replaced with a tubing containing a sequence of liquid samples dispersed in an immiscible continuous liquid. The transfer of the sequence of liquid samples from the tubing into the channel 3 is performed analogously to the transfer from the pipette tip, as described above.

In another preferred embodiment of the present invention (FIG. 3), the microfluidic chip 34 does not contain any additional inlet port for deposition of the liquid samples. In such an embodiment, a tubing 39 containing the liquid samples 36 suspended in an immiscible continuous liquid 37 is hydraulically connected in series in between the hydraulic duct 28 and the microfluidic chip 34.

In another preferred embodiment of the present invention (FIG. 4), the section of the microfluidic chip that enables deposition of liquid samples in the said chip, comprises an inlet port 40 in the form of a well. Preferably, the outlet of the said section of the microfluidic chip is hydraulically interconnected with at least one reservoir 41 of pressure (lower than atmospheric) via a hydraulic duct 42 and an electrically controlled valve 43. In a preferred embodiment, the ducts of the microfluidic chip together with the well 40 are first filled with the continuous liquid 44 via the inlet port 45, and then, the inflow of the continuous liquid is stopped with the use of the electrically controlled valve 46. Then a liquid sample 47 that is immiscible with the said continuous liquid is deposited in the well 40. If the sample fully covers the lumen of the connection between the well 40 and the duct 48, it is next is pulled into the duct 48 by opening the valve 43. Then, the outflow from the microfluidic chip is stopped, and the well is refilled with the continuous liquid 44, by opening the valve 46. The operation of deposition and transfer of a sample of liquid 47 into the duct 48 to the positions 49, schematically drawn in FIG. 4, can be repeated until the required sequence of liquid samples is deposited in the duct 48.

In a preferred embodiment of the present invention, the samples of liquid deposited in the microfluidic chip are later used as a source of liquid for formation of microdroplets on demand, i.e. to form microdroplets at predetermined times of emission and of predetermined volume. In an exemplary embodiment (FIG. 5), the samples 50 deposited through the inlet port 52 into the channel 51, are later being pushed by the flow of the continuous liquid inflowing into the chip via port 53. In this example, the channel 51 containing the samples of liquid 50 to be dispersed into microdroplets, leads to a hydraulic junction 54 interconnecting the said channel with a channel 61 that guides the continuous liquid from the inlet port 55. Optionally, in a preferred embodiment, a detector 56 is placed on the channel 51 upstream of the junction 54. The detector 56 informs the electronic device (not shown in the figure), about the presence of a liquid sample at a defined location in the microfluidic chip. In such a preferred but non-limiting embodiment, the detector is an optical sensor or an electrical sensor. In such a preferred embodiment, the electronic device executes a protocol of signals to the valves controlling the inflow of liquids into the chip in such a way as to advance the front of a given sample of liquid 63 to the junction 54. After the front of the sample of liquid 63 is advanced to the junction 54 the electronic device executes a protocol of electrical signals to the valves that control the flow of the suspension of samples 50 in the channel 51 and the flow of the continuous liquid 64 in channel 61 to generate microdroplets 59 into the outlet channel 60.

In a preferred embodiment of the present invention, generation of a microdroplet comprises effectively out of phase in-flow of the sample liquid 63 into the junction 54 and the outlet channel 60, and of the continuous liquid 64 into the junction 54 and the outlet channel 60.

FIG. 6 depicts an exemplary scheme of the electrical signals that control the flow of the suspension of liquid samples 50 and of the continuous liquid 64 that can be used to generate microdroplets within a wide range of the predetermined volumes of these microdroplets. According to the present invention, the state of the valves controlling the inflow of liquids 50 and 64 into the junction 54, is determined by the temporally varying electrical signals 65 and 66 (FIG. 7). Preferably, the signals 65 and 66 are effectively out of phase, meaning that within the interval 69, when the signal 66 controlling the flow of the liquid 50 to be dispersed into microdroplets has a non-zero value (valve open), the signal 65 controlling the flow of the continuous phase 64 is zero (valve closed). Preferably the process of formation of a microdroplet includes an interval 69, within which the liquid samples 50 flow and the sample 63 that has its front in the junction 62 flows into the channel 60 and forms a growing microdroplet. Effectively within a predetermined phase relationship, during the interval 67 the flow of the continuous phase 64 is stopped. After the tip of the sample liquid 63 has penetrated into the channel 60 and the desired volume of the microdroplet is reached, the electronic unit switches the interval 70 during which the flow of the liquid to be dispersed 50 and 63 is stopped, and effectively synchronized interval 68 within which the continuous phase 64 flows, cuts off the generated microdroplet and carries it downstream into the outlet channel 60. In preferred embodiments of the present invention the interval 69 may be shifted in time with respect to the interval 67, by a temporal shift 71 at the beginning of the interval and by a temporal shift 72 at the end of the interval. The shifts 71 and 72 may have positive or negative values or may be equal to zero. In preferred embodiments it is possible to choose the shifts 71 and 72 in such a way as to compensate for, or take advantage of, temporal delays of the reaction of the valves in response to the changes of the value of the steering signals 65 and 66 in order for the changes of the states of the valves controlling the two liquids inflowing into the junction 62 be effectively synchronized.

FIG. 7 shows exemplary values of the volume of microdroplets generated in a system similar to that sketched in FIG. 5. In this experimental system, all microfluidic channels had a uniform square cross section of nominal dimensions of 200 by 200 micrometers. The microfluidic chip was supplied with liquids via electromagnetic solenoid valves and via capillaries characterized by large hydraulic resistance. The pressure, applied to the reservoir of the liquid to be dispersed, was set to 50 mbar. In one experiment the valve was connected with the microfluidic chip via a steel capillary of internal diameter of 200 micrometers and of length of 100 cm. In the second experiment, the capillary was fabricated in silicone rubber and had the internal diameter of 190 μm and length of 74 cm, and presented the same hydraulic resistance to flow as the steel capillary. The hydraulic compliance of the steel capillary was equal to $C_k=3.89\times10^{-19}$ $m^3/Pa$, and of the silicone rubber capillary was equal to $C_k=3.15\times10^{-14}$ $m^3/Pa$. The graphs shown in FIG. 7 univocally demonstrate that as far as the system constructed in accordance with the present invention and equipped with a steel capillary offers a precise control over the volumes of the microdroplets, the second system equipped with the silicone rubber capillary does not offer satisfactory precision.

Preferably, when the use of the system (FIG. 5) includes formation of long sequence of microdroplets into the outlet channel 60 or into an external hydraulic duct, interconnected with the microfluidic chip via the outlet port 57, it is possible to utilize the additional outlet channel 62 that leads to the outlet port 58, connected fluidically to a reservoir of atmospheric pressure or of pressure that is lower than the pressure in the microfluidic chip. Opening the outflow through port 58, makes the resistance of the microfluidic chip effectively independent of the content of the channel 60, or of any other hydraulic duct interconnected with the chip via port 57. Preferably, the outflow through port 58 is open only during the process of generation of a microdroplet on demand at junction 62.

In a preferred embodiment of the present invention, the microdroplets formed on demand, are later used to form reaction- or incubation mixtures. FIG. 8 depicts schematically a design of an exemplary microfluidic system 83 that can be used to form reaction mixtures. The system comprises two junctions 73 and 74, for independent generation of microdroplets on demand out of samples introduced into channels 75 and 76. Once formed, the microdroplets flow from junctions 73 and 74 to junction 77, where the microdroplets are joined. Preferably, although in a non-limiting fashion, merging of the microdroplets may be stimulated by input of energy from an energy source located at or downstream to junction 77, e.g. by application of either constant or alternating electric field, either parallel or perpendicular to the liquid flow or at an angle inbetween. For example, the electric field can be generated with the use of two electrodes 78 and 79. Preferably the microdroplets are merged to form a larger microdroplet, containing a mixture of solutions for further processing, incubation or detection of the content of such mixture or are transported further to other microfluidic systems or fluidic ducts via port 80. Preferably, the channels that guide microdroplets from junctions 73 and 74 to junction 77, can be equipped with detectors 81 and 82 of the presence of microdroplets. Signals from such detectors may be used to control the flow of the continuous liquid in such a way as to synchronize the appearance of microdroplets in junction 77.

In a preferred embodiment of the present invention and of formation of mixtures of solutions as described above and of detection of the outcome of an incubation or reaction, it is possible to interconnect fluidically a number of microfluidic modules. In an example presented in FIG. 9, the outlet of microfluidic chip 83 is connected with the inlet of a microfluidic module 84 that serves to mix the content of the microdroplet. After being mixed in module 84 the microdroplet flow into module 85, where they are merged with additional microdroplets formed on demand and containing additional solutions. Next, the microdroplets flow into module 86, where they are again mixed, and next, they flow into module 87 containing a detector of the content of the microdroplets. In a preferred and non-limiting example, the mixing modules 84 and 86 may comprise sections of meandering channels that speed up mixing of the content of the microdroplets. In a non-limiting example, the module 87 that performs detection of the result of incubation or reaction inside the microdroplets may comprise a spectrophotometric detector that measures absorbance or transmittance or fluorescence of the microdroplets passing through or resting in the window of the detector. Preferably, the outlet of the module 87 is interconnected hydraulically with a reservoir 88 of atmospheric pressure via an electrically controlled valve 89.

In the module 85 that serves for titrations of reaction (or incubation) with additional microdroplets of additional solution, the microdroplets formed in module 83 and mixed in module 84 flow into the channel 90 and next into the junction 91. In parallel, in junction 92 fresh microdroplets of the additional solution earlier deposited in channel 93 are formed. In junction 91, the microdroplets from module 83 and 84 are merged with microdroplets formed at junction 92. Synchronization of microdroplets may require installation of detectors of the presence of microdroplets in module 85. Merging of microdroplets in junction 91 may be stimulated with an application of an electric field. After merging, the microdroplets flow into the mixing module 86 and detection module 87.

In a preferred embodiment of the present invention (FIG. 10) it is possible to transfer the microdroplets containing mixtures of solutions into a hydraulic duct 94 that connects hydraulically modules 95 and 96. Preferably but not limiting, said microdroplets cover the entire cross-section of the duct 94. Module 95 comprises at least one inlet port that allows for the continuous liquid to be injected into duct 94, from the source of constant rate of flow 97 via an electrically controlled valve 98. Module 96 comprises at least one hydraulic interconnection with a reservoir of atmospheric pressure 99 via an electrically controlled valve 100. It is preferred that the duct 104 passes through a detection module 101. In a non-limiting example, the detection module 101 allows for spectrophotometric measurements to be performed on the content of the microdroplets. In such an exemplary embodiment, module 101 contains a spot (i.e. a window 102 of the detector) which allows for passing light through (either across or along) the microdroplet. In a preferred embodiment it is possible to perform detection both: on microdroplets continually passing through the window 102 of the detector or on microdroplets that are stopped for a given interval of time in the window 102 of the detector. The ability to transport the sequence of microdroplets 104 forward in channel 94, and to stop the flow of these microdroplets for any required interval, allows performing single and multiple measurements on any microdroplet (e.g. 103) in the sequence 104. It is also possible to perform measurements on the whole sequence 104 of microdroplets and to regulate the interval of measurements of any single microdroplet (e.g. 103) in the said sequence.

In a preferred and non-limiting example, module 101 allows for passing light through the lumen of the fluidic duct 94. In a preferred example, the light is delivered to the channel 94 via a waveguide. Similarly, at least a portion of the light that passed through the lumen of the duct 94 or was emitted from the microdroplet 103 within the lumen of the duct 94 is collected into a waveguide and guided to a spectrophotometer.

In a different exemplary embodiment it is possible to deliver light into the lumen of duct 94, without the use of waveguides and to collect at least a portion of light passed through the said lumen or emitted from the said lumen directly onto a sensor positioned in the vicinity of duct 94. Preferably, the angle between light coming into the lumen of the duct 94 and the light collected into the detector is chosen to optimize the resolution and sensitivity of detection. Preferably, in the case of measurements of absorbance and transmittance the angle is equal to zero degrees. Preferably in the case of measurements of fluorescence, the angle is different than zero degrees and may be equal to 90 degrees.

A different, preferred and non-limiting embodiment of the present invention is illustrated schematically in FIG. 11. In this embodiment, the sequence of microdroplets is injected into a hydraulic duct 105 that connects hydraulically modules 106 and 107. Module 106 is connected hydraulically with at least one port that allows injecting continuous liquid from a source 108 of constant rate of flow via an electrically controlled valve 109 and at least one port that allows letting out liquid from the duct 105 into a reservoir 110 of atmospheric pressure via an electrically controlled valve 111. Similarly, module 107 is connected hydraulically with at least one port that allows injecting continuous liquid from a source 112 of constant rate of flow, via an electrically controlled valve 113 and at least one port that allows letting out liquid from the duct 105 into a reservoir 114 of atmospheric pressure, via an electrically controlled valve 115. In a preferred embodiment, the duct 105 comprises a module 116 that serves for detection of the content of the microdroplets. In a non-limiting example, module 116 allows for spectrophotometric detection of the content of microdroplets passing through the duct 105 through the window 117 of the detector. In a preferred example, the sequence 118 of microdroplets containing mixtures of solutions is iteratively transferred forward and backward, between the sections 119 and 120 of the duct 105. The sequence of reaction mixtures 118 is transferred forward and backward, with the use of flow of the continuous phase. Opening of valves 109 and 115 and closure of valves 111 and 113, causes the sequence of microdroplets 118 to flow from section 119 to section 120. Similarly, opening of valves 111 and 113 and closure of valves 109 and 114, causes the sequence 118 of microdroplets to flow from section 120 to section 119. Preferably, in a non-limiting fashion, sections 119 and 120 comprise sensors 121 and 122 of the presence of microdroplets connected to the electric controller 124 via electrical connections 123. The signals from detectors 121 and 122, or signals from detector 116, or both signals from detectors 121 and 122 and from the detector 116, help the electronic unit to judge the position of the sequence 118 of microdroplets and to apply appropriate signals to valves 109, 111, 113 and 115 to execute a protocol of transferring the sequence of microdroplets 118 between sections 119 i 120.

In a preferred embodiment of the present invention, the detection of the content of microdroplets is performed during the flow of microdroplets 118 through the detection module 116. The flow in channel 105 can be stopped at any instant in order to keep any given microdroplet in the window 117 of the detector for a required interval. After the microdroplets have transferred to section 120, the closure of valves 109 and 115 and opening of valves 111 and 113 causes the microdroplets 118 to flow back to section 119, through the detector module 116. Preferably, the system comprises a set of detectors 121 and 122 of the presence of microdroplets that send signals to the electric controller 124 for it, to coordinate the states of the valves 109, 111, 113 and 115.

EXAMPLES OF APPLICATION OF THE INVENTION

Example 1

Formation of Microdroplets

In an exemplary embodiment of the invention, a system as depicted in FIG. 1, but without the optional inlet port 7, can serve to produce microdroplets on demand formed from a liquid supplied from the source 12, through a valve 14 and a hydraulic duct 10, into port 9, as specified by the current invention. The microfluidic subsystem, used in the example, comprised microfluidic channels of a square cross-section of nominal dimensions 100×100 μm. In the example, the liquid to be dispersed is distilled water that does not wet the walls of the microfluidic channels, and the continuous phase supplied from the source 13 through a valve 15 and a fluidic duct 11 into port 4 is a (1% by weight) solution of Span 80 surfactant in hexadecane. In the example each of the ducts 10 and 11 is a steel capillary of a length of 2 m and internal diameter of 200 μm. The pressure applied to the reservoir of oil is 1 bar, and the pressure applied to the reservoir of water is 333 mbar. The system for supplying the liquids is paced at 100 Hz, i.e. each 10 ms a microdroplet is generated at the junction 8. The volume of these microdroplets is controlled by the length of the interval $t_{open}$, during which the valve 14 is open and the valve 15 is closed. The graph shown in FIG. 12 illustrates that the volume of the microdroplets changes linearly from ~0.45 nL to ~4 mL, upon the change of t from 1 ms to 9 ms. The standard deviation calculated from 10 microdroplets generated with the same value of t is less than 1% of the predetermined volume (FIG. 12).

In another example, the same system for supplying liquids and the same liquids are used to generate microdroplets in a microfluidic module analogous to that depicted in FIG. 1 but with all the channels having nominal cross-sections of 200×200 μm. In the example the pressure applied to the reservoir of oil is 2.5 bar, and the pressure applied to the reservoir of water is 700 bar. The system is operated at a range of frequencies f of pacing—from f=10 Hz to f=100 Hz. The time $t_{open}$ during which valve 14 is open and valve 15 is closed changes with frequency and $t_{open}$=(½)(1/f). Graphs shown in FIG. 13 illustrate the ability of the system for on-demand generation of microdroplets in a very wide range of volumes—from ~20 nL to 20 μL and that the standard deviation of volume of microdroplets generated for a given value of $t_{open}$ are less than 2% in the whole range, and less than 1% in a large fraction of the range (~20 nL to 1 μL).

In another exemplary embodiment of the present invention as system similar to the one depicted schematically in FIG. 8 can be used to generate microdroplets of liquids drawn from two different samples deposited in channels 75 and 76. In the example, the channel 75 had a cross-section of (400×400 μm). The sample (~5 μL) deposited in this channel 75 was an aqueous solution of a red ink. This sample was pushed by the flow of continuous liquid of hexadecane into junction 73 and used to generate microdroplets in the range of volumes of 80 mL to 330 mL by changing $t_{open}$ between 50 ms and 500 ms (FIG. 14). In the same example, the channel 76 had a cross-section of (800×800 μm). The sample (~100 μL) of an aqueous solution of blue ink was deposited in this channel 76. This sample was pushed by the flow of continuous liquid of hexadecane into junction 74 and used to generate microdroplets in the range of volumes of ~0.8 μL to ~9.8 μL by changing $t_{open}$ between 150 ms and 2.8 s (FIG. 14). The microdroplets generated in each of the junctions presented an error of administering of their volume less than 1% of the mean volume.

Example 2

Screening of Chemical Compositions of Reaction Mixtures

An exemplary embodiment of the current invention sketched in FIG. 15 can be used to perform a rapid screen of chemical compositions of the reaction mixtures. The system comprises three independent junctions for formation of microdroplets on demand, with each of the junctions supplied with a different solution. In the example the liquids delivered to the junctions were clean water, aqueous solution of red ink and an aqueous solution of blue ink. The system is controlled by an electronic control unit that executes a protocol of synchronized generation of microdroplets at the three junctions in such a way as to screen all the possible combinations of volumes of these three microdroplets summing up to a constant volume of 1.5 μL. The synchronized packets are generated at a rate of 3 Hz, and each of the packets is merged in the junctions of the three microdroplet generators. The merged microdroplet contains the predetermined combination of solutions and clean water. The graph shown in FIG. 15 illustrates a screen of all possible combinations of concentrations of the two inks in steps of 10% of the concentration of the input streams.

Example 3

Albumin and Bilirubin Assays on Serum

An exemplary embodiment of the present invention may comprise a quantitative albumin assay for determination of the concentration of albumin in human or animal serum. Such an exemplary assay may be conducted in a system comprising two reservoirs of pressurized working continuous liquid connected to the microfluidic chip via electronically controlled valves and fluidic ducts that comply with the requirements on their hydraulic resistance and their hydraulic compliance. The microfluidic system comprises a module (e.g. 83) that has two channels that allow for deposition of samples of serum and of the reagent, for on demand generation of microdroplets containing serum and the reagent, and for merging these microdroplets into a larger microdroplet containing the reaction mixture. The system may also comprise a module for mixing (e.g. 84) and for spectrophotometric readout 87. The geometry of the detection module 87 may be chosen in such a way as to obtain a required optical path through the microdroplet. In accordance with the present invention, appropriate steering of the valves that deliver continuous liquid to chip 83 may allow to form microdroplets of precisely determined and desired volume. This allows for precise determination of the relative concentration of serum and reagent in the reaction mixture. This allows to screen the concentration of the reagent in the assay. Further, it is possible to form multiple microdroplets of same or different volume from each sample (of serum and reagent) deposited earlier in the appropriate channels in module 83. The control exerted over formation of microdroplets, their merging, mixing and speed of flow through the modules 83, 84 and 87 allows tuning the interval between the event of merging of the microdroplets into the reaction mixture and the event of spectrophotometric readout of the result of the reaction. Thus the exemplary assay allows for determination of the concentration of albumin in the serum via a colorimetric measurement, and for optimization of albumin assays—i.e. the nature and composition of the reagents and the interval between mixing and measurement for optimum sensitivity and resolution of the assay, minimization of the volume of serum and of reagent needed to perform the test and minimization of the time of incubation between merging of reagents and readout of the result.

In a different example the same microfluidic system can be used for deposition a number of different samples of serum in module 83 and a sample of reagent for colorimetric assay of the concentration of albumin in the same module 83. After such deposition the system may perform a number of assays on a number of different samples of serum.

In a different example, the same system can be used for deposition of a sample of serum in module 83 and a number of samples of different reagents for different single-step serum assays. After such deposition the system may perform a number of different assays on a single sample of serum.

In a different example it is possible to deposit a number of samples of serum and a number of reagents and perform a sequence of different single step colorimetric assays on a sequence of different samples of serum.

In a different example it is possible to perform two-step colorimetric assays on serum. For example it is possible to perform a bilirubin assay. The assay can be performed in a microfluidic system depicted in FIG. 9. In the example it is possible to deposit a sample of serum in module 83 and to deposit a sample of first reagent for the two-step colorimetric assay of bilirubin, also in module 83, and to deposit a sample of the second reagent for the two-step colorimetric assay of bilirubin in module 85. The assay comprises the steps of effectively synchronous generation of microdroplets of serum from the sample of serum, and of the solution of first reagent from its sample in module 83. Then these microdroplets are merged in module 83, mixed in module 84 and transferred to module 85. There the reaction mixture arrives at the junction 91 synchronously with an on demand generated microdroplet of the solution of the second reagent, merged with this microdroplet of the second reagent and transferred to module 86 for mixing. After a predetermined interval the microdroplet containing the mixture of serum and two reagents flows into module 87 for the spectrophotometric measurement of the result of the reaction. The system enables multiple reactions to be performed on single samples of serum and reagents deposited in module 83. Appropriate control of the generation of microdroplets, their merging, rate of flow through the mixing modules allow for tuning of i) the concentration of all constituents of the final reaction mixtures, and ii) the intervals between merging of serum with the first reagent and addition of the second reagent, and between the addition of the second reagent and the spectrophotometric measurement. Such control allows to perform a colorimetric assay of concentration of bilirubin in serum, and to optimize the composition of the reaction mixture and the intervals between additions of reagents and the spectrophotometric measurement for minimization of time and volume of reaction and maximization of sensitivity and resolution of the assay.

In a different example it is possible to deposit a number of different samples of serum in module 83 and to automatically perform a number of assays on a number of different samples of serum. In a different example, it is possible to deposit a number of samples of serum in module 83 and a number of samples of first reagents in module 83 and a number of samples of second reagents in module 85 to perform automatically a sequence of different two-step colorimetric assays on a number of different samples of serum.

In a different example, the system illustrated in FIG. 9 can be used to perform a single-step colorimetric assay. In such an example, the microdroplet of serum formed in module 83 can be merged with a microdroplet of reagent in the same module, and later be mixed in module 84, flow through module 85 without addition of any additional reagents and flow into module 86 and finally into module 87 for a spectrophotometric measurement.

In a different example, a number of samples of serum can be deposited in the first microdroplet generator in module 83 and a number of reagents for single step assays and a number of first reagents for two-step assays can be deposited in the second microdroplet generator in module 83 and a number of corresponding second reagents for two-step assays be deposited in module 85 for any automated sequence of single- and two-step assays on a number of different samples of serum.

Example 4

Kinetic Assays

In a different example a system depicted schematically in FIG. 16 can be used to perform kinetic assays. For example, a sample of serum can be deposited in module 125 and a reagent for a kinetic assay of concentration of α-Amylase can be deposited in the second microdroplet generator in the same module 125. These samples can be used to form microdroplets on demand in module 125. These microdroplets are merged in the same module 125, mixed in module 126, flow through modules 127 and 128 into a fluidic duct connecting modules 129 and 139 that is used for iterative measurements. After the sequence of microdroplets 138 containing same or different concentrations of serum and reagent are transferred into the duct connecting modules 129 and 139 it is possible to use the valves 130, 131, 132 and 133 to either position and hold any microdroplet in the sequence in the window of the detector 135 in the detection module 134 and to perform a sequence of spectrophotometric measurements on any microdroplet. It is also possible (with the use of valves 130, 131, 132 and 133) to transfer the sequence of microdroplets 138 iteratively forward and backward through the window 135 of the detector in order to perform a sequence of spectrophotometric measurements on all or a fraction of the microdroplets in the sequence 138.

It is also possible to use the same system to generate a sequence of reaction mixtures, each characterized by the same or different concentration of serum and reagent, and to tune the interval between mixing of the reagent with the serum and the first spectrophotometric measurement and the intervals between subsequent spectrophotometric measurements on each of the microdroplets in the sequence performed when the sequence of microdroplets is transferred forward and backward through the detection module 134. The system may use detectors 136 and 137 of the presence of microdroplets to control the position of the sequence of microdroplets 138 in the channel connecting modules 129 and 139.

Similarly, the system depicted in FIG. 16 may be used to perform two-step kinetic assays. For example, it is possible to assay the concentration of Alanine transaminase in serum. The samples of serum and of first reagent are deposited in module 125 and the sample of the second reagent is deposited in module 127. On demand generated microdroplets of serum are merged with synchronously generated microdroplets of the first reagent in module 125 the merged microdroplets are mixed in module 126 and then in module 127 these mixed microdroplets are merged with on-demand generated microdroplets of the second reagent. The resulting microdroplets are mixed in module 128 and transferred into the duct between modules 129 and 139. Then the sequence of microdroplets 138 are either transferred a single time through the detector 134 with each microdroplet held in the detector window 135 for an interval allowing to acquire a number of measurements, or the sequence 138 is iteratively transferred forward and backward through the window 135 of the detector to perform a sequence of measurements on each of the microdroplets in the sequence 138.

Similarly, it is possible to use the same system to perform multiple reactions on the microdroplets generated from single samples of serum, first and second reagents to optimize the assay for minimization of time and volume of reaction and maximization of resolution and sensitivity of the readout. Similarly, it is possible to deposit a number of samples of serum, and a number of reagents for single step kinetic assays and first reagents for two-step kinetic assays in module 125 and a number of second reagents for two-step kinetic assays in module 127 to perform automatically a sequence of single and two step kinetic assays on a number of different samples of serum. In such protocols it may be preferred to use detectors 136 and 137 of the presence of microdroplets to appropriately steer the flow of the sequence of microdroplets 138 through the detector 135.

Similarly, it is possible to deposit samples, reagents for single-step and two-step fixed point (single measurement) assays and reagents for single-step and two-step kinetic assays and to perform all these types of assays in an automated sequence. In a preferred but non-limiting example the microdroplets for fixed-point assays are formed first in the sequence of reaction mixtures and the mixtures for kinetic assays are formed second in the sequence of reaction mixtures. In such an example, the sequence of microdroplets 138 is first transferred forward to perform the fixed-point (single time) spectrophotometric measurements on the first part of the sequence, and first of the sequence of spectrophotometric measurements for kinetic assays and then the said sequence of microdroplets 138 is transferred back only to the point that allows for passage of all the mixtures for kinetic assays to be measured iteratively.

In other examples the system discussed above can be used to perform turbidimetric assays of the presence and concentration of antibodies and antigens.

In other examples, the systems discussed above can be used to perform fixed point and kinetic assays and measurements outside of clinical diagnostics. For example, it is possible to use the systems discussed above in optimization of concentrations of reaction mixtures and times of incubation and conditions (i.e. temperature, illumination) in chemical synthesis.

Example 5

Microbiological Toxicity Assays

In a different non limiting example, the system designed in accordance with the present invention can be used to determine the toxicity of chemical compounds and in particular, to determine the minimum inhibitory concentration (MIC) of these compounds. MIC is the smallest concentration of the bactericide or bacteriostatic agent that inhibits the growth of microorganisms. In the example the microfluidic system can comprise a module analogous to module 125 but comprising not two but N junctions for generation of microdroplets on demand from different sources or samples deposited in the module. In an example, the system is used to effectively synchronously form N microdroplets of predetermined volume, each containing a suspension of microorganisms, and solutions of bactericides or bacteriostatic agents, the growth medium and solutions for colorimetric or fluorescent assays of growth of microorganisms. In preferred non limiting examples, the suspension of cells has concentration of $5\times10^5$ CFU (colony forming units), the media include Meuller-Hinton or Luria-Bertani media or a different medium specifically beneficial for a strain of microorganisms or for a given toxicity assay. Detection of the growth of microorganisms may include densitometry via an absorbance measurement, or a measurement of the intensity of fluorescence from a metabolism marker (e.g. Alamar Blue). In such an example the N on-demand formed microdroplets are merged into an incubation mixture, the resulting microdroplet is mixed in a module analogous to module 126 and then the sequence of incubation mixtures is transferred to a fluidic duct in which it is incubated for a required time. Then the sequence of microdroplets is transferred through a detection module for readout of the growth (or level of metabolism) of the colony of microorganisms in the microdroplet.

In a different example, a screen of measurements performed on a sequence of incubation mixtures each containing a different set of concentrations of bactericides and/or bacteriostats can be used to determine the toxicity of mixtures of bactericides and/or bacteriostats and to determine the epigenetic interactions between these compounds.

In a different non limiting example it is possible to use a system similar to the one depicted schematically in FIG. 16 to form a sequence of incubation mixtures each containing a predetermined concentration of a number of bactericides and/or bacteriostats, and to perform multiple measurements of the density of the colonies in the microdroplets or of the level of metabolism of the colonies in the microdroplets to monitor the growth of microbial colonies as a function of the composition of the incubation mixtures.

In a different example it is possible to use a similar system to screen the rate of growth of bacterial colonies against the composition of media and to optimize the composition of media for most rapid growth of selected strains of microorganisms.

The invention claimed is:

1. A system, comprising:

microfluidic subsystem, and a supplying part for supplying said microfluidic subsystem with liquids, said supplying part comprising a first valve and a first fluidic duct for connecting said first valve with said microfluidic subsystem and supplying a first liquid, and a second valve and a second fluidic duct for connecting said second valve with said microfluidic subsystem and supplying a second liquid, wherein said first valve and said second valve are closable with time resolution not worse than 100 msec, wherein parameters of said first fluidic duct, second fluidic duct, first valve and second valve are such that the following conditions are fulfilled:

a hydraulic resistance of said first fluidic duct or said second fluidic duct is at least 10 times higher than a hydraulic resistance of the inlet of said first valve or second valve, respectively, and said first fluidic duct and said second fluidic duct each satisfy the following equation:

$$\frac{L_i^2}{A_i} < 10^4 \mathrm{Pa}^{-1} \alpha_{R_i}^{-1} \left(0.5 \cdot 10^{-9} + \frac{1}{E_i}\right)^{-1},$$

wherein $E_i$ is the Young modulus of the material of which the fluidic duct is made, $L_i$ is the length of the fluidic duct, $A_i$ is the surface area of a lumen of the fluidic duct, $\alpha_{Ri}$ is a constant characterizing a geometry of the fluidic duct, and $R_i$ represents hydraulic resistance, wherein a hydraulic resistance $R_i$ of said first fluidic duct and said second fluidic duct satisfies the following equation:

$$R_i = \alpha_{Ri}(L_i \mu / A_i^2)$$

wherein $\mu$ is a dynamic viscosity coefficient of the liquid filling said first fluidic duct or said second fluidic duct.

2. The system according to claim 1, wherein at least one of said first fluidic duct and said second fluidic duct is made of material selected from the group consisting of silicone rubber, Teflon, polyethylene, PEEK, glass and steel.

3. The system according to claim 1, Wherein hydraulic compliance $C_{ci}$ associated with the elasticity of said first fluidic duct or said second fluidic duct is not higher than $10^{-16}$ m$^3$/Pa.

4. The system according to claim 1, wherein the hydraulic resistance of said first fluidic duct or second fluidic duct is higher than a hydraulic resistance of said microfluidic subsystem.

5. The system according to claim 1, Wherein at least one of said first valve and said second valve is closable with time resolution not worse than 10 msec.

6. The system according to claim 1, wherein at least one of said first valve and said second valve is a piezoelectric valve, a membrane valve or a microvalve.

7. The system according to claim 1, further comprising an electric controller controlling at least one of said first valve and said second valve.

8. The system according to claim 7, wherein said supplying part further comprises an inlet port for droplets of a third liquid, said inlet port for droplets of the third liquid being connected to a reservoir of lower pressure or connected to a vacuum by a valve, such that opening of said valve causes pulling-in of the droplets of the third liquid via said inlet port into said supplying part, and where said supplying part supplies a sequence of the droplets of the third liquid to said microfluidic system, the third liquid being immiscible with the first liquid and the second liquid.

9. The system according to claim 7, wherein said supplying part further comprises an inlet port for droplets of a third liquid, said inlet port for droplets of the third liquid being connected to a source of said droplets of the third liquid, and wherein said supplying part supplies a sequence of the droplets of the third liquid to said microfluidic system, the third liquid being immiscible with the first liquid and the second liquid and suspended in the first liquid or the second liquid.

10. The system according to claim 9, wherein said source of said sequence of the droplets of the third liquid is a fluidic duct or a pipette.

11. The system according to claim 1, further comprising:

a junction of said first fluidic duct and said second fluidic duct, a third fluidic duct leading from said junction to a first outlet port, a valve connected with said third fluidic duct through a second outlet port, wherein said valve is connected to a reservoir of lower pressure or is connected to a vacuum, wherein opening of said valve decreases hydraulic resistance at least in part of said third fluidic duct.

12. The system according to claim 7, further comprising at least one detector of a flow in said first fluidic duct or said second fluidic duct, wherein said at least one detector is in communication with said electric controller such that at least one of said first valve and said second valve can be opened or closed according to signals from said detector.

13. The system according to claim 9, further comprising at least one detector of a flow in said first fluidic duct or said second fluidic duct in communication with said electric controller such that at least one of said first valve and said second valve can be opened or closed according to signals from said detector.

14. The system according to claim 11, wherein said detector is configured to detect and transmit a signal to an electric controller about a head of a droplet approaching said junction of said first fluidic duct and said second fluidic duct.

15. The system according to claim 13, wherein said detector is configured to detect and transmit a signal to said electric controller about a head of a droplet approaching a junction of said first fluidic duct and said second fluidic duct.

16. The system according to claim 1, further comprising:

at least two additional valves, wherein a first valve of said at least two additional valves is connected to a source of pressure higher that a second valve of said at least two additional valves, wherein said at least two additional valves being connected to a part of said first fluidic duct or said second fluidic duct, wherein opening of both said at least two additional valves causes flow of liquid in said part of said first fluidic dud or said second fluidic duct in a direction from said first valve of said at least two additional valves to said second valve of said at least two additional valves, and wherein closing of both said at least two additional valves causes a stop of the flow of liquid in said part of said first fluidic duct or said second fluidic duct.

17. The system according to claim 16, wherein said at least two additional valves are two pairs of valves, wherein, in each pair, a first valve of said pair of valves is connected to a source of pressure higher that a second valve of said pair of valves, and wherein said pairs of valves are connected to said part of said first fluidic duct or said second fluidic duct, wherein opening of both valves in a first pair of said two pairs of valves while closing of both valves in a second pair of said two pairs of valves causes the flow of liquid in said part of said first fluidic duct or said second fluidic duct in a first direction, and wherein opening of both valves in said second pair of said two pairs of valves while closing of both valves in said first pair of said two pairs of valves causes the flow of liquid in said part of said first fluidic duct or said second fluidic duct in an opposite direction to the first direction.

18. The system according to claim 1, wherein said microfluidic subsystem comprises a fluidic duct having a meandering part for mixing liquids.

19. The system according to claim 1, further comprising a module for detection comprising means for delivering a radiation beam to said first fluidic duet or said second fluidic duct, and a detector of radiation that passed through the liquid in said first fluidic duct or said second fluidic duct.

20. The system according to claim 1, wherein said microfluidic subsystem is disposable.

21. The system according to claim 1, Wherein said microfluidic subsystem comprises two or more releasably connectable parts.

22. The system according to claim 1, wherein one of said first valve, said second valve, said first fluidic duct and said second fluidic duct of said supplying part is integrated with said microfluidic subsystem.

23. The system according to claim 1, wherein said first fluidic duct and said second fluidic duct each satisfy the following equation:

$$\frac{L_i^2}{A_i} < 10^3 \mathrm{Pa}^{-1} \alpha_{R_i}^{-1} \left(0.5 \cdot 10^{-9} + \frac{1}{E_i}\right)^{-1}.$$

24. The system according to claim 1, wherein said first fluidic duct and said second fluidic duct each satisfy the following equation:

$$\frac{L_i^2}{A_i} < 10^2 \mathrm{Pa}^{-1} \alpha_{R_i}^{-1} \left(0.5 \cdot 10^{-9} + \frac{1}{E_i}\right)^{-1}.$$

25. The system according to claim 1, wherein said first fluidic duct and said second fluidic duct each satisfy the following equation:

$$\frac{L_i^2}{A_i} < 10 \mathrm{Pa}^{-1} \alpha_{R_i}^{-1} \left(0.5 \cdot 10^{-9} + \frac{1}{E_i}\right)^{-1}.$$

26. The system according to claim 1, wherein the hydraulic resistance of said first fluidic duct or said second fluidic duct is at least 100 times higher than the hydraulic resistance of the inlet of said first valve or second valve, respectively.

27. The system according to claim 3, wherein hydraulic compliance $C_{ci}$ associated with the elasticity of said first fluidic duct or said second fluidic duct is not higher than $10^{-18}$ $m^3$/Pa.

28. The system according to claim 3, wherein hydraulic compliance C associated with the elasticity of said first duct or said second fluidic duct is not higher than $10^{-20}$ $m^3$/Pa.

29. The system according to claim 4, wherein the hydraulic resistance of said first fluidic duct or second fluidic duct is at least 10 times higher than the hydraulic resistance of said microfluidic subsystem.

30. The system according to claim 4, wherein the hydraulic resistance of said first fluidic duct or second fluidic duct is at least 100 times higher than the hydraulic resistance of said microfluidic subsystem.

31. The system according to claim 12, wherein said at least one detector of a flow in a fluidic duct is a photo detector.

32. The system according to claim 13, wherein said at least one detector of a flow in a fluidic duct is a photo detector.

33. The system according to claim 20, wherein said a module for detection is a module for spectrophotometric detection, and wherein said means for delivery of a radiation beam to a fluid duct is a waveguide.

34. A method for producing microdroplets on demand in a system comprising a first fluidic duct and a second fluidic duct, which meet at a junction, said method comprising the steps of:

supplying a microfluidic subsystem with a first liquid through a first valve and a first fluidic duct, supplying said microfluidic subsystem with a second liquid through a second valve and a second fluidic duct, controlling a flow of said first liquid by opening and closing said first valve, and controlling a flow of said second liquid by opening and closing said second valve, wherein said second valve is closed when said first valve is open, and said second valve is open when said first valve is closed, so as to generate said microdroplets on said junction of said first and second fluidic ducts, wherein parameters of said first fluidic duct, second fluidic duct, first valve and second valve are such that the following conditions are fulfilled:

a hydraulic resistance of said first fluidic duct or said second fluidic duct is at least 10 times higher than a hydraulic resistance of the inlet of said first valve or second valve, respectively, and said first fluidic duct and said second fluidic duct each satisfy the following equation:

$$\frac{L_i^2}{A_i} < 10^4\text{Pa}^{-1}\alpha_{R_i}^{-1}\left(0.5\cdot 10^{-9} + \frac{1}{E_i}\right)^{-1},$$

wherein $E_i$ is the Young modulus of the material of which the fluidic duct is made, $L_i$ is the length of the fluidic duct, $A_i$ is the surface area of a lumen of the fluidic duct, $\alpha_{Ri}$ is a constant characterizing a geometry of the fluidic duct, and $R_i$ represents hydraulic resistance, wherein a hydraulic resistance $R_i$ of said first fluidic duct and said second fluidic duct satisfies the following equation:

$$R_i = \alpha_{Ri}(L_i\mu/A_i^2)$$

wherein μ is a dynamic viscosity coefficient of the liquid filling said first fluidic duct or said second fluidic duct.

35. The method according to claim 34, Wherein at least one of said first fluidic duct and said second fluidic duct is made of material selected from the group consisting of silicone rubber, Teflon, polyethylene, PEEK, glass and steel.

36. The method according to claim 34, wherein said second liquid flows continuously and wets walls of microchannels in said microfluidic subsystem.

37. The method according to claim 36, wherein said first liquid does not wet the walls of microchannels in said microfluidic subsystem, and wherein said first liquid is immiscible with said second liquid.

38. The method according to claim 37, wherein said microdroplets are generated on demand due to the flow of said first and second liquids through said junction of said first fluidic duct and said second fluidic duct.

39. The method according to claim 36, further comprising:

a step of providing a third liquid to the system, wherein said third liquid does not wet the walls of microchannels in said microfluidic subsystem, wherein said third liquid is immiscible with said first liquid and said second liquid, and wherein said first liquid flows continuously and wets the walls of microchannels in said microfluidic subsystem.

40. The method according to claim 39, wherein said third liquid is provided in the form of droplets through an inlet port leading into the first fluidic duct, and wherein after the droplets are transferred into said first fluidic duct, outflow of droplets from said inlet port into the first fluidic duct is closed, and inflow into said first fluidic duct is open, in order to push the droplets through the first fluidic duct by the flow of said first liquid.

41. The method according to claim 40, further comprising a step of providing said microfluidic system with a sequence of droplets of said third liquid dispensed in said first or second liquid.

42. The method according to claim 36, wherein beginnings and ends of time intervals when said first valve is open are shifted in time with respect to beginnings and ends of time intervals when said second valve is closed.

43. The method according to claim 36, wherein time shifts between steering impulses sent from a controller to said first valve and said second valve, in order to open or close said first valve and said second valve, are provided so as to compensate for or take advantage of electromechanical inertia of said first valve and said second valve, such that time intervals when said first valve and said second valve are open or closed are essentially synchronized.

44. The method according to claim 43, wherein said steering impulses are rectangular impulses.

45. The method according to claim 36, further comprising a step of producing reaction mixtures having required concentrations of reactants by merging said microdroplets of a predetermined volume of said first liquid and said second liquid.

46. The method according to claim 45, wherein the microdroplets have a volume from 0.01 nL to 10 mL.

47. The method according to claim 34, wherein said first fluidic duct and said second fluidic duct each satisfy the following equation:

$$\frac{L_i^2}{A_i} < 10^3\text{Pa}^{-1}\alpha_{R_i}^{-1}\left(0.5\cdot 10^{-9} + \frac{1}{E_i}\right)^{-1}.$$

48. The method according to claim 34, wherein said first fluidic duct and said second fluidic duct each satisfy the following equation:

$$\frac{L_i^2}{A_i} < 10^2\text{Pa}^{-1}\alpha_{R_i}^{-1}\left(0.5\cdot 10^{-9} + \frac{1}{E_i}\right)^{-1}.$$

49. The method according to claim 34, wherein said first fluidic duct and said second fluidic duet each satisfy the following equation:

$$\frac{L_i^2}{A_i} < 10\text{Pa}^{-1}\alpha_{R_i}^{-1}\left(0.5\cdot 10^{-9} + \frac{1}{E_i}\right)^{-1}.$$

50. The method according to claim 34, wherein the hydraulic resistance of said first fluidic duct or said second fluidic duct is at least 100 times higher than the hydraulic, resistance of the inlet of said first valve or second valve, respectively.

* * * * *